US010867180B2

(12) United States Patent
Badr et al.

(10) Patent No.: US 10,867,180 B2
(45) Date of Patent: Dec. 15, 2020

(54) RESOLVING AUTOMATED ASSISTANT REQUESTS THAT ARE BASED ON IMAGE(S) AND/OR OTHER SENSOR DATA

(71) Applicant: Google LLC, Mountain View, CA (US)

(72) Inventors: Ibrahim Badr, Zurich (CH); Nils Grimsmo, Adliswil (CH); Gökhan Bakir, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/360,789

(22) Filed: Mar. 21, 2019

(65) Prior Publication Data

US 2019/0220667 A1    Jul. 18, 2019

Related U.S. Application Data

(63) Continuation of application No. 15/631,274, filed on Jun. 23, 2017, now Pat. No. 10,275,651.

(Continued)

(51) Int. Cl.
*G06K 9/00*    (2006.01)
*G06F 3/16*    (2006.01)
(Continued)

(52) U.S. Cl.
CPC ......... *G06K 9/00671* (2013.01); *G06F 3/167* (2013.01); *G06F 16/5854* (2019.01);
(Continued)

(58) Field of Classification Search
CPC ................................................ G06K 2209/17
See application file for complete search history.

(56) References Cited

U.S. PATENT DOCUMENTS 9,235,824 B2*  1/2016  Martin ................. G06Q 10/087
10,049,276 B1*  8/2018  Harper ............... H04N 21/4425
(Continued)

FOREIGN PATENT DOCUMENTS

CN    101939740    1/2011
CN    102893327    1/2013
(Continued)

OTHER PUBLICATIONS

International Search Report and Written Opinion of PCT Serial No. PCT/US2018/032786; 14 pages dated Aug. 31, 2018.

(Continued)

*Primary Examiner* — Oneal R Mistry
(74) *Attorney, Agent, or Firm* — Middleton Reutlinger

(57) ABSTRACT

Methods, apparatus, and computer readable media are described related to causing processing of sensor data to be performed in response to determining a request related to an environmental object that is likely captured by the sensor data. Some implementations further relate to determining whether the request is resolvable based on the processing of the sensor data. When it is determined that the request is not resolvable, a prompt is determined and provided as user interface output, where the prompt provides guidance on further input that will enable the request to be resolved. In those implementations, the further input (e.g., additional sensor data and/or the user interface input) received in response to the prompt can then be utilized to resolve the request.

17 Claims, 11 Drawing Sheets

Related U.S. Application Data

(60) Provisional application No. 62/507,153, filed on May 16, 2017.

(51) Int. Cl.
    *G06F 16/9032*      (2019.01)
    *G06F 16/583*      (2019.01)
    *H04L 12/58*      (2006.01)

(52) U.S. Cl.
    CPC ........ *G06F 16/90332* (2019.01); *H04L 51/02* (2013.01); *G06K 2209/17* (2013.01)

(56) References Cited

U.S. PATENT DOCUMENTS

| | | | |
|---|---|---|---|
| 2011/0161076 | A1 | 6/2011 | Davis et al. |
| 2014/0201572 | A1* | 7/2014 | Dancy .................... G06F 16/50 714/37 |
| 2015/0088923 | A1 | 3/2015 | Garcia-Barrio et al. |
| 2016/0154996 | A1 | 6/2016 | Shin et al. |
| 2018/0159979 | A1* | 6/2018 | Amir .................... H04M 3/5183 |
| 2018/0302285 | A1* | 10/2018 | Roman ............... H04L 41/0806 |

FOREIGN PATENT DOCUMENTS

| | | |
|---|---|---|
| JP | 2016200666 | 12/2016 |
| KR | 1020120075487 | 7/2012 |
| KR | 1020130035983 | 4/2013 |
| KR | 1020150068013 | 6/2015 |
| KR | 1020160065574 | 6/2016 |
| WO | 2014197336 | 12/2014 |
| WO | 2015042270 | 3/2015 |
| WO | 2015088141 | 6/2015 |

OTHER PUBLICATIONS

Japanese Patent Office; Notice of Reasons for Rejection issue in Application No. 2019563496; 4 pages; dated May 25, 2020.

China National Intellectual Property Administration; Notification of First Office Action issue in Application No. 201880032505.2; 14 pages; dated Apr. 28, 2020.

China National Intellectual Property Administration: Notice to Grant issued for Application No. 201880032505.2 dated Aug. 27, 2020.

The Korean Intellectual Property Office; Allowance of Patent issued in Application No. 10-2019-7035456; 3 pages; dated Dec. 6, 2019.

* cited by examiner

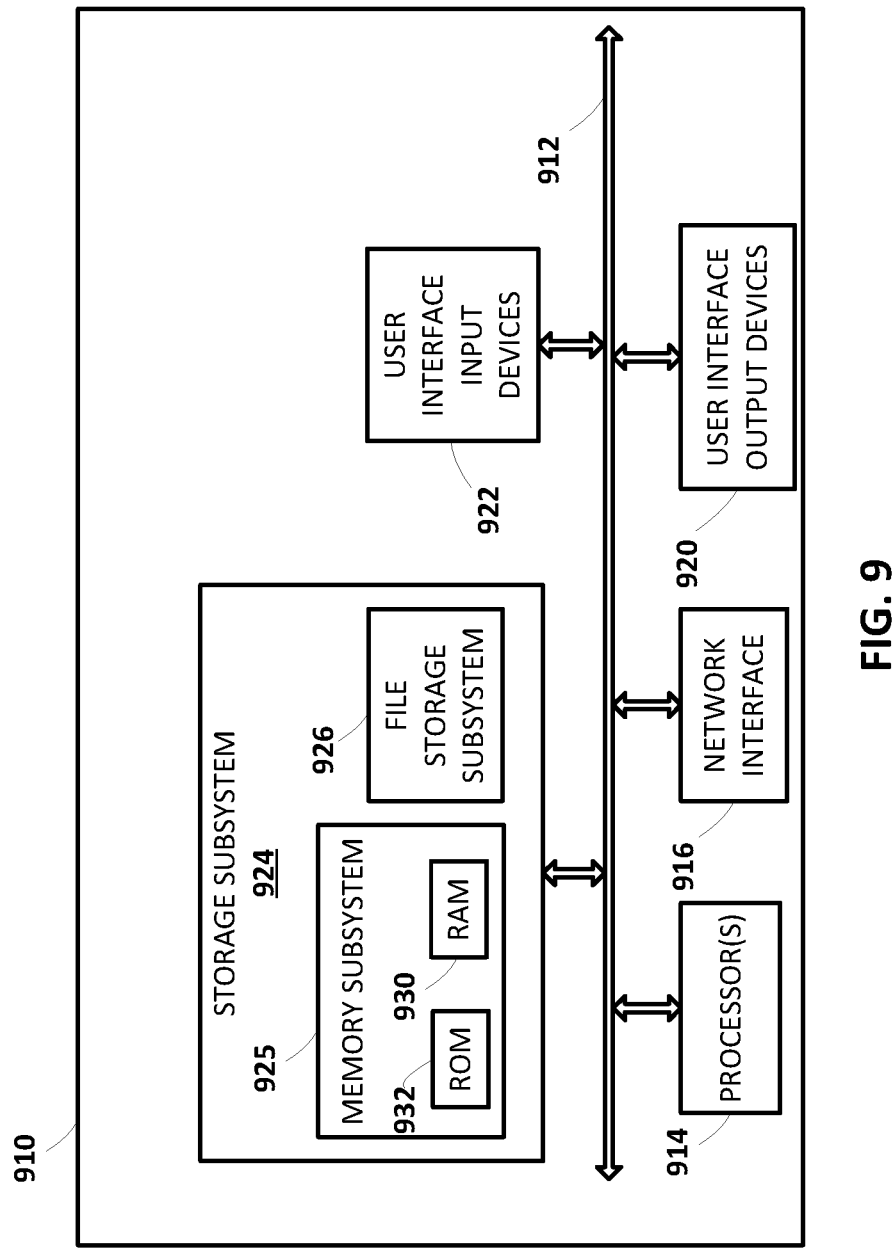

RESOLVING AUTOMATED ASSISTANT REQUESTS THAT ARE BASED ON IMAGE(S) AND/OR OTHER SENSOR DATA

BACKGROUND

Image processing can be utilized to resolve attribute(s) for an object in an image. For example, some image processing techniques utilize image processing engine(s) to resolve classification(s) for object(s) captured in the image. For instance, for an image that captures a sailboat, image processing can be performed to resolve classification values(s) of "boat" and/or "sailboat" for the image. Additional or alternative attributes can be resolved utilizing image processing. For example, optical character recognition (OCR) can be utilized to resolve text in an image. Also, for example, some image processing techniques can be utilized to determine more particular classifications of an object in an image (e.g., a particular make and/or model of a sailboat).

Some image processing engines utilize one or more machine learning models, such as a deep neural network model that accepts an image as input, and that utilizes learned parameters to generate, as output based on the image, measure(s) that indicate which of a plurality of corresponding attributes are present in an image. If a measure indicates that a particular attribute is present in an image (e.g., if the measure satisfies a threshold), that attribute can be considered "resolved" for the image (i.e., that attribute can be considered to be present in the image). However, it may often be the case that image processing of an image may be unable to resolve one or more (e.g., any) attributes. Moreover, it may further be the case that the resolved attributes for an image do not enable definition of an object in the image with a desired degree of specificity. For example, resolved attributes of an image may enable determination that a "shirt" is present in an image, and that the shirt is "red"—but may not enable determination of a manufacturer of the shirt, whether the shirt is "short sleeve" or "long sleeve", etc.

Separately, humans may engage in human-to-computer dialogs with interactive software applications referred to herein as "automated assistants" (also referred to as "interactive personal assistants," "intelligent personal assistants," "personal voice assistants," "conversational agents," etc.). Automated assistants often receive natural language input (utterances) from users. The natural language input can in some cases be received as audio input (e.g., streaming audio) and converted into text and/or received as textual (e.g., typed) natural language input. Automated assistants respond to natural language input with responsive content (e.g., visual and/or audible natural language output). However, it may often be the case that automated assistants do not accept and/or respond to requests that are based on sensor data (e.g., image(s)) that captures one or more properties of an environmental object.

SUMMARY

Implementations described herein relate to causing processing of sensor data to be performed in response to determining a request related to an environmental object that is likely captured by the sensor data. For example, image processing can be performed on an image in response to a request determined based on natural language input provided by a user in conjunction with the capture of the at least one image (e.g., natural language input received shortly before, shortly after, and/or during capture of the at least one image). For instance, a user can provide, via an automated assistant interface of a client device, voice input of "how much does this cost". It can be determined that the voice input relates to an environmental object and, as a result, image processing can be performed on an image captured by a camera of the client device. The image can be captured by the camera based on separate user interface input (e.g., selection of an "image capture" interface element), or can be captured automatically in response to determining the voice input relates to an environmental object.

Some implementations described herein further relate to determining whether the request is resolvable based on the processing of the sensor data. For example, a request can be determined to not be resolvable based on determining that attribute(s) (if any) that are resolved based on the image processing of the at least one image fail to define the object with a target degree of specificity. When it is determined that the request is not resolvable, a prompt is determined and provided as user interface output (e.g., audible and/or graphical), where the prompt provides guidance on further input that will enable the request to be resolved. The prompt can instruct a user to capture additional sensor data (e.g., image(s), audio, temperature sensor data, weight sensor data) for the object and/or to move the object (and/or other object(s)) to enable capturing of additional sensor data for the object. For example, the prompt can be tailored to enable capturing of additional images that enable resolution of one or more attribute(s) that are unresolved based on the image processing of the at least one image. The prompt can additionally or alternatively solicit the user to provide user interface input (e.g., natural language input) directed to unresolved attribute(s) of the object.

In those implementations, the additional sensor data (e.g., additional image(s)) and/or the user interface input received in response to the prompt can then be utilized to resolve the request. For example, image processing can be performed on an additional image received in response to the prompt, and additional attribute(s) resolved from that image processing can be utilized to resolve the request. For instance, the request can be resolved by submitting an agent request to one or more agents (e.g., a search system and/or other agent), where the agent request is generated based on the additional attribute(s) resolved from the image processing of the additional image, and optionally based on attribute(s) determined based on the processing of the prior sensor data (e.g., determined based on image processing of prior image(s)). As another example, additional attribute(s) can be resolved based on natural language input or other user interface input received in response to the prompt, and such additional attribute(s) utilized to resolve the request. It is noted that in some implementations and/or situations, multiple rounds of prompts can be provided, additional attribute(s) determined from additional sensor data and/or user interface input(s) that are responsive to those prompts, and such additional attribute(s) utilized in resolving the request.

As mentioned above, a request can be determined to not be resolvable based on determining that attribute(s) (if any) that are resolved based on the processing of the sensor data fail to define the object with a target degree of specificity. In some implementations, the target degree of specificity for an object can be a target degree of classification of the object in a classification taxonomy. For example, a target degree of classification of a car can be classification to a level that defines the make and model of the car, or to a level that defines the make, model, and year of the car. In some implementations, the target degree of specificity for an object can be defined with reference to one or more fields to be defined, where the fields for the object can be dependent on a classification (general or specific) of the object. For example, for a bottle of wine, fields can be defined for a particular brand, a wine type, and/or a vintage—and the target degree of specificity is resolution of an attribute for all of those fields. In some implementations, the target degree of specificity can additionally or alternatively be determined based on initial natural language input provided by the user, feedback provided by the user, historical interactions of the user and/or other users, and/or location and/or other contextual signals.

As also mentioned above, a determined prompt can provide guidance on further input that will enable resolution of a request related to an environmental object. In some implementations, the prompt is determined based on one or more attribute(s) for the object that have been resolved. For example, a classification attribute for the environmental object can be utilized, such as a classification attribute resolved based on image processing of prior captured image(s) of the object. For instance, a prompt for a "car" classification may be particularized to the car classification (e.g., "take a picture of the car from another angle"). Also, for instance, a prompt for a "jacket" classification may be particularized to the "jacket" classification (e.g., "take a picture of the logo or the tag"). Also, for example, as described above, a classification attribute can be associated with one or more fields to be defined. In some of those situations, the prompt can be generated based on field(s) that are not defined by the already resolved attribute(s) (if any). For instance, if a vintage field for a bottle of wine is not yet defined, the prompt can be "take a picture of the year" or "what is the year?".

Some implementations described herein can provide the described prompt(s) for presentation to a user only when it is determined that: (1) there is a request (e.g., a request for additional information) related to an environmental object and/or (2) that the request is unable to be resolved based on processing of so-far collected sensor data. In this manner, computational resources are not wasted through the provision of unnecessary prompts and/or processing of further input that would be responsive to such unnecessary prompts. For example, where a user captures an image of a bottle of wine and provides natural language input of "send this picture to Bob", a prompt requesting the user to take additional image(s) of the bottle of wine will not be provided based on the request (i.e., sending the image to Bob) being resolvable based on only the captured image and/or based on the request not being a request for additional information related to the bottle of wine. If the natural language input is instead "how much does this cost", a prompt requesting the user to take additional image(s) may be provided if image processing of the initial image is unable to resolve sufficient attributes for resolving the request (i.e., determining cost). For instance, if a brand, wine type, and/or vintage cannot be resolved based on the image processing, a prompt of "take a picture of the label" can be provided. As yet another example, when the user is at a "retail" location, a request related to an environmental object of a captured image can be inferred, whereas no request would be inferred if the user had instead captured the same environmental object at a park (under the assumption that the user is likely seeking shopping intelligence while at the retail location, such as price(s), review(s), etc.). As yet another example, where an initially captured image captures multiple objects all at far distances, a request may not be inferred—whereas the request would have been inferred if the image instead captured only one object at a close distance.

Some implementations described herein can also determine prompts that are: tailored to already resolved attributes (e.g., a classification attribute); tailored to yet to be resolved field(s); and/or otherwise tailored to enable resolution of a request. In this manner, a prompts can be tailored to increase the likelihood that input that is responsive to the prompt (e.g., image(s) and/or user interface input) will enable resolution of the request—thereby mitigating the need for further prompts in resolving the request and/or processing of further input that would be responsive to such further prompts.

As one explicit example of some implementations, assume a user provides voice input of "what kind of reviews does this get?" while pointing a camera of a client device (e.g., a smartphone, a tablet, a wearable device) at a bottle of wine. It can be determined that the voice input includes a request related to an object in the environment of the client device. In response to the voice input including the request, an image of the bottle of wine can be processed to resolve one or more attributes of an object in the image. For example, the image can be processed to determine a classification of "bottle" and/or "wine bottle". In some implementations, the image can be captured based on user interface input, or can be captured automatically based on determining that the voice input includes the request.

Further, it can be determined that the request is not resolvable based on the resolved "bottle" and/or "wine bottle" classification(s). For example, based on the voice input it can be determined that the request is for reviews for the particular wine in the bottle (e.g., the particular brand, wine type, and/or vintage)—not for a "wine bottle" in general. Accordingly, resolution of the request requires resolution of enough attribute(s) to enable determination of the particular wine in the bottle. The general classification(s) of "bottle" and "wine bottle" fail to enable such determination.

A prompt can then be provided in response to determining that the request is not resolvable. For example, the prompt can be "can you take a picture of the label" or "can you make the barcode visible to the camera?", etc. In response to the prompt, the user can move the wine bottle and/or the electronic device (and therefore the camera) and additional image(s) captured following such movement. Processing of the additional image(s) can then be performed to determine attribute(s) for the selected parameter(s). For example, OCR processing can be performed to determine text values for the label, such as text that includes the brand name, the wine type, and the vintage. If processing of the additional image(s) still doesn't enable resolution of the request (e.g., required attribute(s) are still unresolved), further prompts may be generated, and image processing of further images, received after the further prompts, performed.

Additional content can then be generated based on the additional attributes. For example, the additional content can be received in response to issuing a search based on the additional attributes and/or the spoken input. For example, text values of "Vineyard A Cabernet Sauvignon 2012" may have been determined, a query of "reviews for vineyard A cabernet sauvignon 2012" submitted (e.g., to a search system agent), and the additional content received in response to the query.

As described herein, one or more prompts may additionally or alternatively solicit a user to provide responsive user interface input to enable resolution of attribute(s) for unresolved field(s). For example, assume that processing of one or more images is utilized to determine a "wine bottle" classification value, but is unable to resolve enough text to unambiguously identify the wine. For instance, text that identifies a particular brand was identified, but not text that identifies the wine type and the year. Instead of or in addition to prompting the user to capture an additional image and/or move the bottle of wine, a prompt can request that the user identify the wine type and the year (e.g., "can you tell me the wine type and year for the Brand X wine?"). Responsive user interface input provided by the user can then be utilized to resolve the wine type and year. In some implementations, the prompts can be generated to include one or more candidate attributes determined based on image processing. For example, assume OCR image processing techniques are utilized to determine candidate vintages of "2017" and "2010". For instance, the image processing techniques may identify "2017" and "2010" as candidates, but not identify either with sufficient confidence to enable resolution of a particular vintage. In such a situation, the prompt may be "Is this a 2010 or 2017 vintage?"—or may provide selectable options of "2010" and "2017".

In some implementations, multiple processing engines and/or models may be operated in parallel, and each may be particularly configured for one or more particular fields. For example, a first image processing engine may be a general classification engine configured to determine general entities in images, a second image processing engine may be a logo processing engine configured to determine brands of logos in images, a third image processing engine may be an OCR or other character recognition engine configured to determine textual and/or numerical characters in images, etc. In some of those implementations, prompts may be generated based on which image processing engine(s) failed to resolve attribute(s) for corresponding field(s). Further, in some of those implementations, in response to additional image(s) received in response to a prompt, only a subset of the engine(s) may be utilized to process such additional image(s). For example, only those engines configured to resolve unresolved field(s)/parameter(s) may be utilized, thereby conserving various computational resources by not utilizing the full suite of engines for such images.

In some implementations, a method performed by one or more processors is provided that includes: receiving, via an automated assistant interface of a client device, a voice input provided by a user; and determining that the voice input includes a request related to an object in an environment of the client device. The method further includes, in response to determining that the voice input includes the request related to the object: causing processing to be performed on initial sensor data captured by at least one sensor. The at least one sensor is of the client device or an additional electronic device in the environment, and the initial sensor data captures one or more characteristics of the object. The method further includes determining, based on one or more initial attributes of the object resolved based on the processing of the initial sensor data, that the request is not resolvable based on the initial sensor data. The method further includes, in response to determining that the request is not resolvable: providing, for presentation to the user via the automated assistant interface of the client device, a prompt that instructs the user to capture additional sensor data or to move the object. The method further includes: receiving additional sensor data captured by the client device or the additional electronic device after the prompt is presented to the user; causing processing to be performed on the additional sensor data; and resolving the request based on at least one additional attribute resolved based on the processing of the additional sensor data.

In some implementations, a method performed by one or more processors is provided that includes: receiving at least one image captured by a camera of a client device; and determining that the at least one image relates to a request related to an object captured by the at least one image. The method further includes, in response to determining that the image relates to the request related to the object: causing image processing to be performed on the at least one image. The method further includes determining, based on the image processing of the at least one image, that at least one parameter necessary for resolving the request is not resolvable based on the image processing of the at least one image. The method further includes, in response to determining that the at least one parameter is not resolvable: providing, for presentation via the client device or an additional client device, a prompt that is tailored to the at least one parameter. The method further includes: receiving, in response to the prompt, an additional image captured by the camera and/or user interface input; resolving a given attribute for the at least one parameter based the additional image and/or the user interface input; and resolving the request based on the given attribute.

In some implementations, a method performed by one or more processors is provided that includes: receiving, via an automated assistant interface of a client device, natural language input provided by a user; and determining that the natural language input includes a request related to an object in an environment of the client device. The method further includes, in response to determining that the natural language input includes the request related to the object: causing processing to be performed on initial sensor data that is captured by a sensor of the client device or an additional electronic device in the environment. The method further includes determining, based on one or more initial attributes of the object resolved based on the processing of the initial sensor data, that the request is not resolvable based on the initial sensor data. The method further includes, in response to determining that the request is not resolvable: providing a prompt for presentation to the user via the automated assistant interface of the client device. The method further includes: receiving natural language input or an image in response to the prompt; and resolving the request based on the natural language input or the image.

In some implementations, a method performed by one or more processors is provided that includes: processing at least one image captured by a camera of an electronic device to resolve one or more attributes for an object in the at least one image; selecting one or more fields for the object that are undefined by the attributes resolved by the processing of the at least one image; providing, via the electronic device or an additional electronic device, a prompt that is tailored to at least one of the selected one or more fields; receiving, in response to the prompt, at least one of: an additional image captured by the camera, and user interface input; resolving a given attribute for the selected one or more fields based on the at least one of the additional image and the user interface input; determining additional content based on the resolved given attribute; and providing, via the electronic device, the additional content for presentation to the user.

In some implementations, a method performed by one or more processors is provided that includes: processing at least one image captured by a camera of an electronic device to resolve one or more attributes for an object in the at least one image; selecting one or more fields for the object that are undefined by the attributes resolved by the processing of the at least one image; providing, via the electronic device or an additional electronic device, a prompt for presentation to a user; receiving at least one additional image captured after providing the prompt; and selecting a subset of available image processing engines for processing the at least one additional image. The available image processing engines of the subset are selected based on being associated with resolution of the one or more fields. The method further includes resolving one or more additional attributes for the one or more fields based on application of the at least one additional image to the selected subset of the available image processing engines. Resolving the one or more additional attributes occurs without any application of the at least one additional image to other of the available image processing engines not included in the selected subset.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 9 illustrates an example architecture of a computing device.

DETAILED DESCRIPTION

Figure 1:
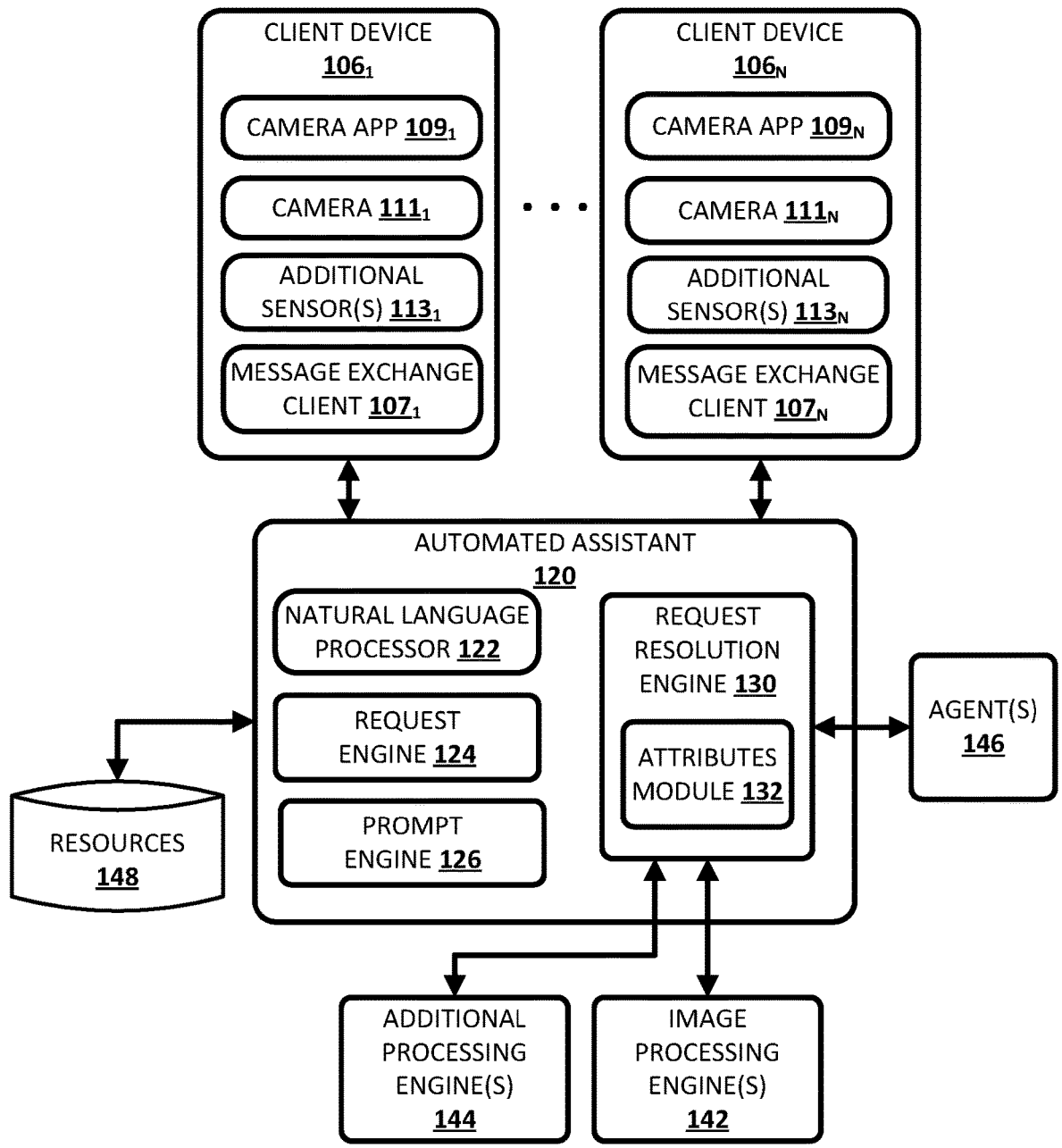
FIG. 1 is a block diagram of an example environment in which techniques disclosed herein may be implemented.

FIG. 1 illustrates an example environment in which techniques disclosed herein may be implemented. The example environment includes a plurality of client devices $106_{1-N}$ and an automated assistant 120. Although automated assistant 120 is illustrated in FIG. 1 as separate from the client devices $106_{1-N}$, in some implementations all or aspects of automated assistant 120 may be implemented by one or more of the client devices $106_{1-N}$. For example, client device $106_1$ may implement one or more instances of one or more aspects of automated assistant 120 and client device $106_N$ may also implement a separate instance of those one or more aspects of automated assistant 120. In implementations where one or more aspects of automated assistant 120 are implemented by one or more computing devices remote from client devices $106_{1-N}$, the client devices $106_{1-N}$ and those aspects of automated assistant 120 may communicate via one or more networks such as a local area network (LAN) and/or wide area network (WAN) (e.g., the Internet).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a stand-alone interactive speaker, a smart camera, and/or a wearable apparatus of the user that includes a computing device (e.g., a watch of the user having a computing device, glasses of the user having a computing device, a virtual or augmented reality computing device). Additional and/or alternative client computing devices may be provided.

In some implementations, a given user may communicate with automated assistant 120 utilizing a plurality of client devices that collectively from a coordinated "ecosystem" of computing devices. In some such implementations, automated assistant 120 may be considered to "serve" that given user, e.g., endowing automated assistant 120 with enhanced access to resources (e.g., content, documents, etc.) for which access is controlled by the "served" user. However, for the sake of brevity, some examples described in this specification will focus on a user operating a single client device.

Each of the client devices $106_{1-N}$ may operate a variety of different applications, such as a corresponding one of a plurality of message exchange clients $107_{1-N}$ and a corresponding one of a plurality of camera applications $109_{1-N}$. Each client device 106 may also be equipped with one or more cameras 111 (e.g., a front-facing and/or rear-facing camera in the case of a smart phone or tablet) and/or one or more additional sensors 113. The additional sensors 113 may include, for example, a microphone, a temperature sensor, a weight sensor, etc. In some implementations, one or more of the additional sensors 113 may be provided as part of a stand-alone peripheral device that is separate from, but is in communication with, one or more corresponding client devices 106 and/or the automated assistant 120. For example, one of the additional sensor(s) $113_1$ can be included in a peripheral scale and can generate sensor data that indicates the weight of an object placed on the scale.

Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

Camera applications $109_{1-N}$ may enable users to control cameras $111_{1-N}$. For example, one or more of camera applications $109_{1-N}$ may provide graphical user interfaces that users may interact with to capture one or more images and/or videos. In some implementations, camera applications $109_{1-N}$ may interact/interface with automated assistant 120 as described herein to enable users to resolve requests associated with images captured by cameras $111_{1-N}$. In other implementations, one or more of camera applications $109_{1-N}$ may have its own built-in functionality, distinct from automated assistant 120, that enables users to resolve requests associated with images captured by cameras $111_{1-N}$. Additionally or alternatively, in some implementations, message exchange client 107 or any other application installed on a client device 106 may include functionality that enables the application to access data captured by camera 111 and/or additional sensor(s) 113, and perform techniques described herein.

The cameras $111_{1-N}$ can include monographic cameras, stereographic cameras, and/or thermographic cameras. Although client device $106_1$ and client device $106_N$ are each illustrated in FIG. 1 with only a single camera, in many implementations a client device may include multiple cameras. For example, a client device can have a forward facing and a rear facing monographic camera. Also, for example, a client device can have a stereographic camera and a thermographic camera. Also, for example, a client device can have a monographic camera and a thermographic camera. Moreover, in various implementations, sensor data utilized in techniques described herein can include images from multiple disparate types of cameras (of the same client device and/or of multiple client devices). For example, image(s) from a monographic camera may be initially utilized to determine a request is not resolvable and image(s) from a separate thermographic camera subsequently received (e.g., in response to a prompt) and utilized in resolving the request. Additionally, in some implementations sensor data from other vision sensors may be utilized, such as point cloud sensor data from a three-dimensional laser scanner.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$.

In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input. In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may engage in interactive voice response ("IVR"), such that the user can utter commands, searches, etc., and the automated assistant 120 may utilize natural language processing and/or one or more grammars to convert the utterances into text, and respond accordingly.

Each of the client computing devices $106_{1-N}$ and automated assistant 120 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

Automated assistant 120 may include, among other components not depicted in FIG. 1, a natural language processor 122, a request engine 124, a prompt engine 126, and a request resolution engine 130 (that includes an attributes module 132). In some implementations, one or more of the engines and/or modules of automated assistant 120 may be omitted, combined, and/or implemented in a component that is separate from automated assistant 120. In some implementations, automated assistant 120 generates responsive content in response to various inputs from the client devices $106_{1-N}$ during a human-to-computer dialog session with automated assistant 120. Automated assistant 120 provides the responsive content (e.g., over one or more networks when separate from a client device of a user) for presentation to the user as part of the dialog session. For example, automated assistant 120 may generate responsive content in response to free-form natural language input provided via one of the client devices $106_{1-N}$, in response to image(s) captured by one of the cameras 111, and/or in response to additional sensor data captured by one or more of the additional sensor(s) 113. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants in the dialog). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

In some implementations, when automated assistant 120 provides a prompt that solicits user feedback in the form of user interface input (e.g., spoken input and/or typed input), automated assistant 120 may preemptively activate one or more components of the client device (via which the prompt is provided) that are configured to process user interface input to be received in response to the prompt. For example, where the user interface input is to be provided via a microphone of the client device $106_1$, automated assistant 120 may provide one or more commands to cause: the microphone to be preemptively "opened" (thereby preventing the need to hit an interface element or speak a "hot word" to open the microphone), a local speech to text processor of the client device $106_1$ to be preemptively activated, a communications session between the client device $106_1$ and a remote speech to text processor (e.g., a remotely located speech to text processor of the automated assistant 120) to be preemptively established, and/or a graphical user interface to be rendered on the client device $106_1$ (e.g., an interface that includes one or more selectable elements that may be selected to provide feedback). This may enable the user interface input to be provided and/or processed more quickly than if the components were not preemptively activated.

Natural language processor 122 of automated assistant 120 processes natural language input generated by users via client devices $106_{1-N}$ and may generate annotated output for use by one or more other components of automated assistant 120, such as request engine 124, prompt engine 126, and/or request resolution engine 130. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input. In some implementations, the natural language processor 122 includes a voice processing module that is configured to process voice (spoken) natural language input. The natural language processor 122 can then operate on the processed voice input (e.g., based on text derived from the processed voice input). For example, the voice processing module may be a voice-to-text module that receives free-form natural language voice input in the form of a streaming audio recording and converts that voice input into text utilizing one or more voice-to-text models. For instance, a client device can generate the streaming audio recording in response to signals received from a microphone of the client device while a user is speaking, and can transmit the streaming audio recording to the automated assistant for processing by the voice-to-text module.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

The request engine 124 utilizes one or more signals to determine when there is a request related to an object in an environment of a client device associated with the request. For example, the request engine 124 can determine a request related to an object in the environment of the client device $106_1$ based on natural language input provided via the client device $106_1$, image(s) captured by the camera $111_1$, additional sensor data from additional sensor(s) $113_1$, and/or a detected location of client device $106_1$ and/or other contextual attributes.

As one example, the request engine 124 can determine such a request based on natural language input (e.g., a spoken voice input) provided by a user via the client device $106_1$. For instance, the request engine 124 can rely on annotations from natural language processor 122 to determine that certain utterances likely relate to an object in the environment, such as the utterances of "what is this", "where can I buy this", "how much does this cost", "how much does this thing weigh", "tell me more about that", etc. In some implementations, the request engine 124 can determine such a request based on an utterance including a proform (e.g., an ambiguous pronoun such as "this", "this thing", "it", "that") that cannot be co-reference resolved (e.g., by the natural language processor 122) to an antecedent in prior natural language input. In other words, the request engine 124 can assume the utterance relates to an environmental object due to the request referencing a proform that is unresolvable to an antecedent of prior natural language input. In some implementations, the request engine 124 can cause image(s) and/or other sensor data to be captured by the client device $106_1$ in response to determining that an utterance relates to an environmental object. For example, the request engine 124 can provide one or more commands to the camera $111_1$ and/or the camera application $109_1$ to cause one or more images to be captured. In some of those implementations, the request engine 124 can cause images to be captured without requiring a user of the client device 106₁ to select an "image capture" interface element, provide a verbal "capture image" command", and/or otherwise physically interact with the client device 106₁ to cause the image(s) to be captured. In some implementations, confirmation from the user can be required prior to capture of the image(s). For example, the request engine 124 can cause user interface output of "I need to capture an image to answer your request" to be provided, and the image(s) caused to be captured only in response to an affirmative user response (e.g., "OK").

As another example, the request engine 124 can additionally or alternatively determine such a request based on an image, a sound recording, and/or other sensor data being captured via the client device 106₁. For example, the request engine 124 can determine such a request based on an utterance being provided in conjunction with the capture of at least one image via the camera 111₁ (e.g., shortly before, shortly after, and/or during capture of the at least one image). For instance, an utterance of "what is this" within X seconds of capturing an image via the camera 111₁ in response to user interface input. The image can be captured via the camera 111₁ in the context of an assistant application of the client device 106₁ (e.g., an application devoted solely to interactions with the automated assistant 120), or in the context of another application of the client device 106₁, such as a camera application, a chat application, etc. Accordingly, in some implementations the request engine 124 can determine such a request based on image(s) and/or utterances captured from any of a plurality of disparate applications. Also, for example, the request engine 124 can determine such a request based on sensor data being captured—and can determine such a request independent of any utterance. For instance, the request engine 124 can determine such a request based on the user capturing an image in certain contexts (e.g., when location data client device 106₁ indicates the user is at a retail location). As yet another example, the request engine 124 can determine such a request in response to a user causing a recording to be captured via a microphone of the additional sensor(s) 113₁. For instance, the user can cause an audio recording to be captured, where the audio recording captures a noise being made by a vacuum of the user, and then provide an utterance of "why is my vacuum making this noise".

As another example, the request engine 124 can additionally or alternatively determine such a request based on an interface element selected by the user and/or based on an image and/or other sensor data being captured via a particular interface. For example, after capturing an image via the camera application 109₁, a graphical interface element of "find out more" can be presented (e.g., based on output from the automated assistant 120) as a suggestion via the camera application 109₁, and a selection of the graphical interface element can be interpreted by the request engine 124 as a request for additional information about an object captured by the image. Also, for example, if the user utilizes the message exchange client 107₁ and/or other application specifically tailored to the automated assistant 120 (e.g., a client application that is devoted solely to interactions with the automated assistant 120) to capture an image and/or other sensor data, such a capture can be interpreted by the request engine 124 as a request related to an object captured by the sensor data.

When there is a request related to an object in an environment of a client device associated with the request (e.g., as determined by the request engine 124), the request resolution engine 130 attempts to resolve the request. In attempting to resolve the request, the request resolution engine 130 can utilize natural language input (if any) associated with the request, image(s) and/or other sensor data associated with the request, and/or other content. As described in more detail herein, the request resolution engine 130 can interface with one or more agent(s) 146, image processing engine(s) 142, and/or additional processing engine(s) 144 in determining whether a request is resolvable.

If the request resolution engine 130 determines a request is resolvable, the request resolution engine 130 can interact with one or more agents 146 in resolving the request. The agents 146 can include one or more so-called first-party (1P) agents that are controlled by the same party that controls the automated assistant 120 and/or can include one or more so-called third-party (3P) agents that are controlled by a separate party. As one example, the agent(s) 146 can include a search system (a 1P search system or a 3P search system), and the request resolution engine 130 can resolve the request by submitting a search to the search system, receiving responsive content (e.g., a single "answer"), and providing the responsive content for presentation via the client device 106₁.

If the request resolution engine 130 determines the request is not resolvable, the request resolution engine 130 can cause the prompt engine 126 to determine one or more prompts to provide for presentation via the client device 106₁. A prompt determined by the prompt engine 126 can instruct a user to capture additional sensor data (e.g., image(s), audio, temperature sensor data, weight sensor data) for the object and/or to move the object (and/or other object(s)) to enable capturing of additional sensor data for the object. The prompt can additionally or alternatively solicit the user to provide user interface input directed to unresolved attributes of the object.

The request resolution engine 130 can then utilize the additional sensor data and/or the user interface input received in response to the prompt, to again attempt to resolve the request. If the request is still not resolvable, the request resolution engine 130 can cause the prompt engine 126 to determine one or more additional prompts to provide for presentation via the client device 106₁. Additional sensor data and/or user interface input received in response to such additional prompt(s) can then be utilized to again attempt to resolve the request. This can continue until the request is resolved, a threshold number of prompts is reached, a threshold time period has elapsed, and/or until one or more other criteria have been achieved.

The request resolution engine 130 optionally includes an attributes module 132 that determines various attributes for an object indicated by the request. As described herein, the attributes can be utilized in determining whether a request is resolvable and/or in determining prompt(s) to provide when it is determined a request is not resolvable. The attributes module 132 can interface with image processing engine(s) 142 and/or additional processing engine(s) 144 in determining the various attributes. For example, the attributes module 132 can provide captured image(s) to one or more of the image processing engine(s) 142. The image processing engine(s) 142 can perform image processing on such image(s) and provide, in response, attribute(s) (if any) that are resolvable based on the captured image(s). Also, for example, the attributes module 132 can provide other captured sensor data to one or more of the additional processing engine(s) 144. The additional processing engine(s) 144 can perform processing on such image(s) and provide, in response, attribute(s) (if any) that are resolvable based on the captured sensor data. For instance, one of the additional processing engine(s) 144 may be configured to process audio data to determine one or more attributes of the audio data such as entities present in the audio data (e.g., a particular object that is the source of a sound in the audio data), and/or other attributes of the audio data (e.g., the number and/or frequency of "beeps" in the audio data).

In some implementations, the request resolution engine 130 determines a request is not resolvable based on determining that attribute(s) (if any) resolved by the attributes module 132 fail to define the object with a target degree of specificity. In some implementations, the target degree of specificity for an object can be a target degree of classification of the object in a classification taxonomy. For example, a target degree of classification of a car can be classification to a level that defines the make and model of the car, or to a level that defines the make, model, and year of the car. Such target degrees of classification can optionally be stored in, and accessed from, resources database 148. In some implementations, the target degree of specificity for an object can be defined with reference to one or more fields to be defined, where the fields for the object can be dependent on a classification (general or specific) of the object. For example, for a bottle of wine, fields can be defined for particular brand, wine type, and/or vintage—and the target degree of specificity is resolution of an attribute for all of those fields. Such fields to be defined for a classification of an object can optionally be stored in, and accessed from, resources database 148. In some implementations, the target degree of specificity can be determined based on initial natural language input provided by the user, feedback provided by the user, historical interactions of the user and/or other users, and/or location and/or other contextual signals.

In some implementations, prompt engine 126 determines a prompt that provides guidance on further input that will enable resolution of a request related to an environmental object. In some of those implementations, the prompt is determined based on one or more attribute(s) for the object that have been resolved by the attributes module 132. For example, a classification attribute for the environmental object can be determined by the attributes module 132, such as a classification attribute resolved by one of the image processing engines 142 based on a captured image(s). For instance, the prompt engine 126 can determine a prompt for a "car" classification that is particularized to the car classification (e.g., "take a picture of the back of the car"). Also, for instance, the prompt engine 126 can determine a prompt for a "jacket" classification that is particularized to the "jacket" classification (e.g., "take a picture of the logo"). Also, for example, in some implementations a classification attribute can be associated with one or more fields to be defined. In some of those situations, the prompt can be generated based on field(s) that have not been defined by the attribute(s) (if any) already determined by the attributes module 132. For instance, if a vintage field for a bottle of wine is not yet defined, the prompt can be "take a picture of the year" or "what is the year?".

Additional description of various components of FIG. 1 is now provided with reference to the examples of FIGS. 2A-8. Although some of the components of FIG. 1 are not depicted in FIGS. 2A-8, they are referenced in the discussion below in describing certain examples of functionality of the various components.

Figure 2A:
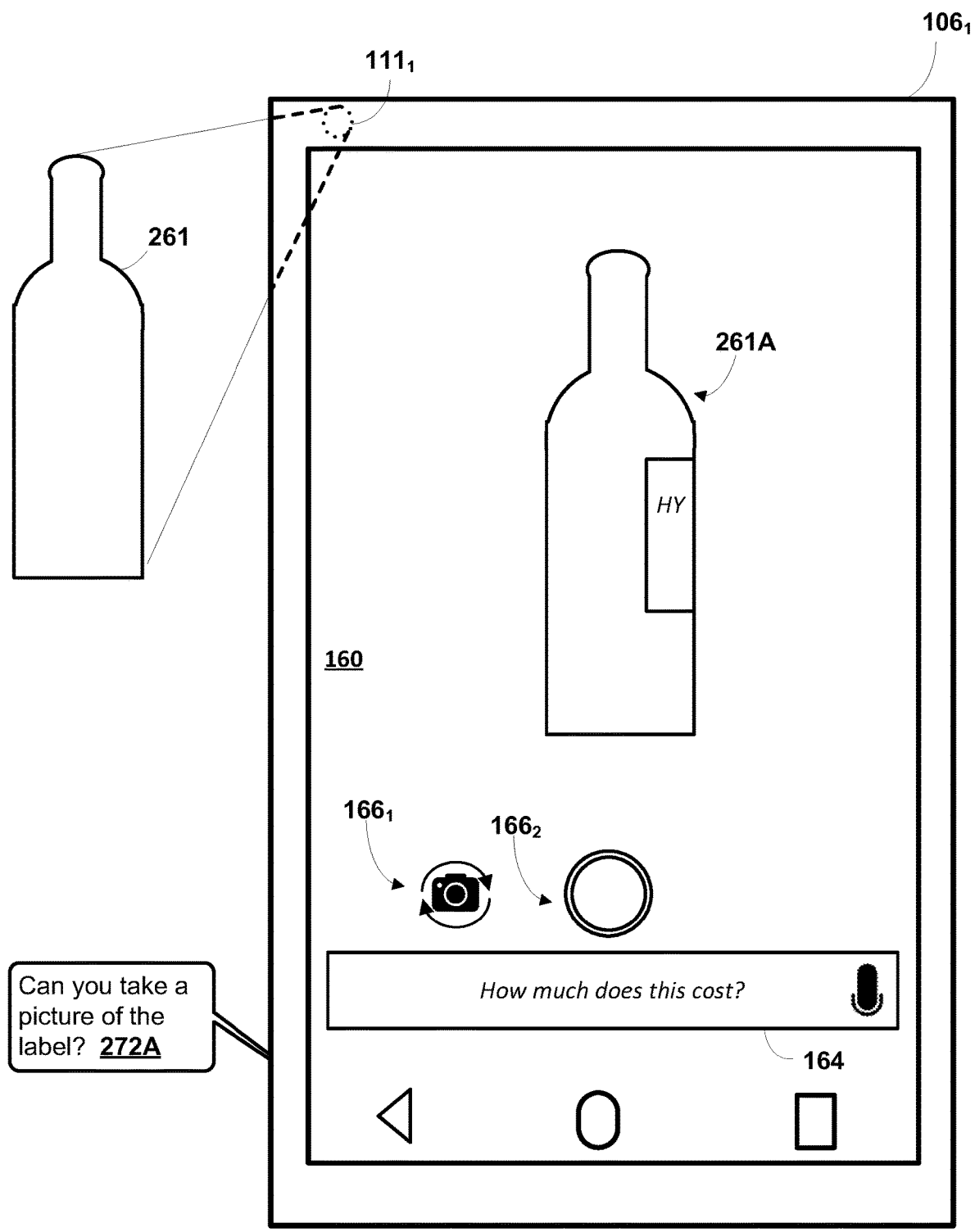
FIGS. 2A, 2B, 3, 4, 5A, 5B, 6, and 7 depict examples of how techniques described herein may be employed, in accordance with various implementations.
Figure 2B:
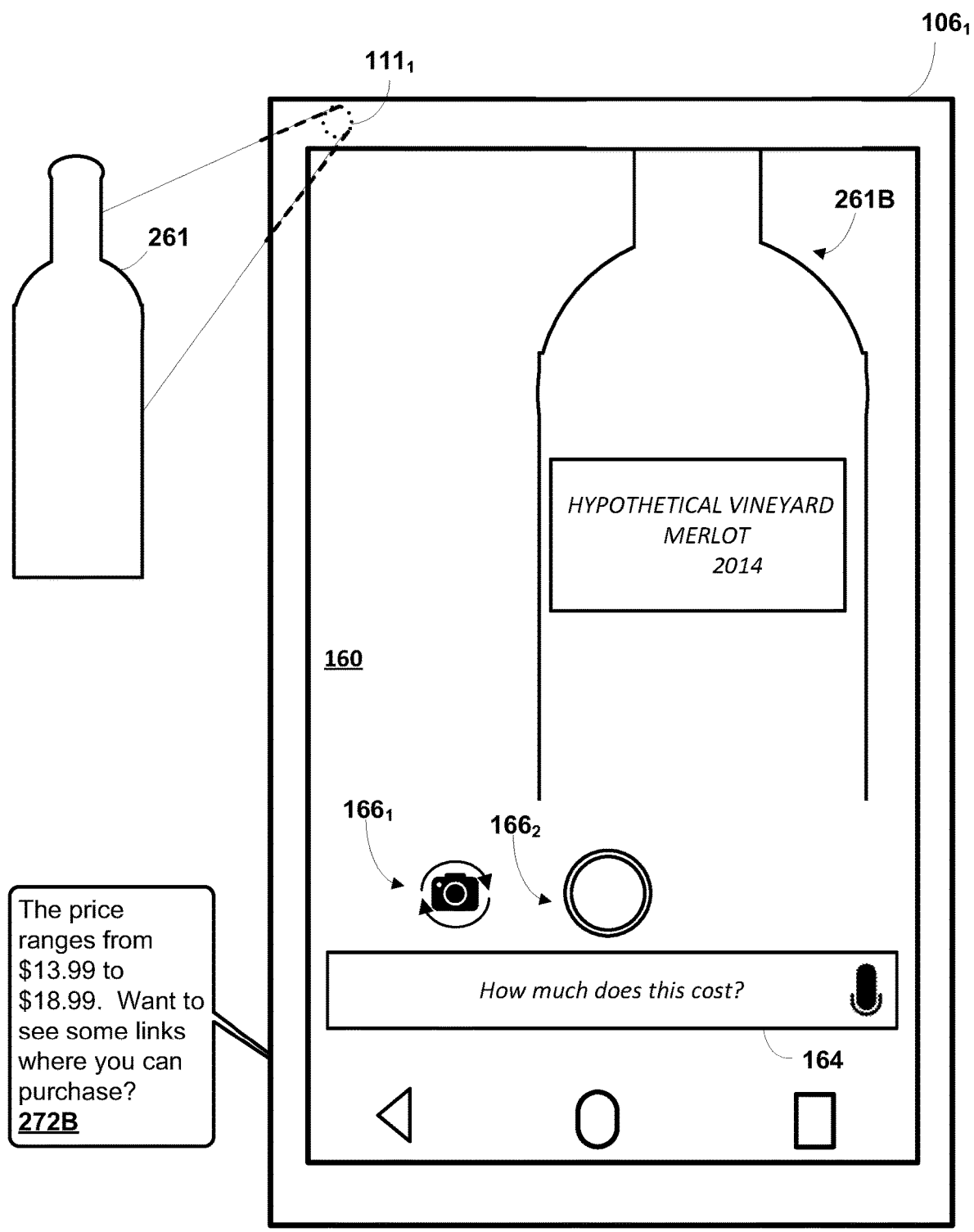

FIGS. 2A, and 2B illustrate an example of how a user (not depicted) may interact with an instance of automated assistant (120 in FIG. 1) operating on, and/or in conjunction with, client device 106$_1$ in accordance with implementations described herein. Client device 106$_1$ takes the form of a smart phone or tablet computer that includes a touchscreen 160 and at least one camera 111$_1$ (front-facing and/or rear-facing). Rendered on touchscreen 160 is a graphical user interface associated with camera functionality (e.g., camera application 109 in FIG. 1 and/or other application which includes an electronic viewfinder) that renders, e.g., in real time, sensor data captured by camera 111$_1$. The graphical user interface includes a user input field 164 and one or more graphical elements 166$_{1,2}$ that may be operable to control operation of camera 111$_1$. For example, first graphical element 166$_1$ may be operable to switch between front- and rear-facing cameras and second graphical element 166$_2$ may be operable to capture an image (or video (which captures multiple images in succession) depending on the settings) using camera 111$_1$. Other graphical elements that are not depicted in FIGS. 2A and 2B may be operable to perform other actions, such as changing camera settings, switching between image capture and video capture modes, adding various effects, etc.

User input field 164 may be operable by a user to provide various input, such as free-form natural language input that can be provided to the automated assistant 120. The free-form natural language input can be typed user interface input (e.g., via a virtual keyboard, not depicted) and/or can be voice input provided by a user (e.g., by clicking the microphone icon on the right, or speaking a "hot word"). For example, where aspects of the automated assistant 120 are implemented remote from the client device 106$_1$, and voice input is provided via user input field 164, a streaming version of the voice input may be transmitted over one or more networks to the automated assistant 120. In various implementations, voice input provided via user input field 164 may be converted to text, e.g., at client device 106$_1$ and/or remotely (e.g., at one or more cloud-based components of the automated assistant 120).

Camera 111$_1$ in FIG. 2A has captured a bottle of wine 261 in its field of view. Consequently, a rendition 261A of the bottle of wine 261 appears on touchscreen 160 as part of the aforementioned electronic viewfinder. In various implementations, the user may invoke automated assistant 120, e.g., by tapping in user input field 164 or by speaking an invocation phrase such as "Hey Automated Assistant." Once automated assistant 120 is invoked, the user speak or types natural language input of "How much does this cost?". Additionally or alternatively, the user may provide a single natural language input that both invokes automated assistant 120 and provides the natural language input (e.g., "Hey assistant, how much does this cost?"). In some implementations, whenever a camera application is active on a client device, automated assistant 120 may be invoked automatically, or may be invoked in response to different invocation phrases that otherwise would not invoke automated assistant 120. For example, in some implementations, when camera application 109$_1$ is active (i.e., being interacted with by user, presented as a graphical user interface, etc.), the automated assistant 120 may be invoked.

The request engine 124 of the automated assistant 120 can determine that the natural language input of "How much does this cost" relates to an object in the environment of the client device 106$_1$. In some implementations, the request engine 124 can cause an image of the environment to be captured in response to such a determination (e.g., an image that captures the rendition 261A of FIG. 2A). In some other implementations, the user may cause the image to be captured (e.g., through selection of second graphical element 166₂) and provide the natural language input in conjunction with (e.g., shortly before, during, or shortly after) the capturing of the image. In some of those implementations, the request engine 124 can determine a request relates to an object in the environment based on both the natural language input and the capturing of the image by the user.

The request engine 124 provides an indication of the request to the request resolution engine 130. The request resolution engine 130 attempts to resolve the request using the natural language input and the captured image. For example, the request resolution engine 130 can provide the captured image to one or more of the image processing engine(s) 142. The image processing engine(s) 142 can process the captured image to determine a classification attribute of "wine bottle", and return the classification attribute to the request resolution engine 130. The request resolution engine 130 can further determine that the request is for a "cost" action (e.g., based on output provided by natural language processor 122, which is based on "how much does this cost?"). Further, for a "cost" action for an object that is a "wine bottle", request resolution engine 130 can determine that, to resolve the request, attributes need to be resolved for the fields of: brand, wine type, and vintage. For example, the request resolution engine 130 can determine those fields based on looking up defined fields for a "cost" action for a "wine bottle" classification in resources database 148. Also, for example, the request resolution engine 130 can determine those fields based on what fields are indicated as required by an agent, of agent(s) 136, that can handle the request (e.g., a "wine cost" agent, a more general "liquor cost" agent, or an even more general "search system" agent). For instance, an agent can be associated with a "wine cost" intent and may define mandatory slots/fields of "brand", "wine type", and "vintage" for that "wine cost" intent.

The request resolution engine 130 can further determine that it is unable to resolve the request based on the provided natural language input and the image processing of the captured image. For example, the request resolution engine 130 can determine that the brand, wine type, and vintage are not resolvable. For instance, those are not resolvable from the natural language input, and the image processing engine(s) 142 may have provided only the "wine bottle" classification attribute (e.g., they were unable to resolve more granular attributes due to, for example, the label being obscured in the captured image that corresponds to rendition 261A of FIG. 2A).

Based on the request being unresolvable, the prompt engine 126 determines and provides a prompt 272A of "Can you take a picture of the label?". The prompt 272A is illustrated in FIG. 2A as an audible prompt (e.g., provided via a speaker of the client device 106₁). However, in other implementations a graphical prompt may additionally and/or alternatively be provided. When an audible prompt is provided, a text-to-speech processor module can optionally be utilized to convert a textual prompt to the audible prompt. For example, the prompt engine 126 can include a text-to-speech processor, convert a textual prompt to an audio form (e.g., streaming audio), and provide the audio form to the client device 106₁ for audible presentation via speaker(s) of the client device 106₁. The prompt engine 126 can determine the prompt 272A based on the "wine bottle" classification attribute determined by request resolution engine 130 and/or based on the brand, wine type, and vintage fields being unresolved by the request resolution engine 130. For example, the resources database 148 may define, for a "wine bottle" classification and/or for unresolved fields of brand, wine type, and/or vintage—that a prompt such as prompt 272A should be provided (e.g., that prompt (or portions thereof) may be stored in association with the "wine bottle" classification and/or the unresolved fields).

In FIG. 2B, an additional image is captured by the camera 111₁, where the additional image captures the label of the bottle of wine 261. For example, the additional image can capture an image that conforms to the rendition 261B of the bottle of wine 261 shown in the electronic viewfinder of FIG. 2B. To capture such an image, the user can reposition the bottle of wine 261 (e.g., turn it so the label is visible and/or move it closer to the camera 111₁), can reposition the camera 111₁, and/or can adjust a zoom (hardware and/or software) and/or other characteristic of the camera 111₁ (e.g., via a "pinching out" gesture on the touchscreen 160). In some implementations, the additional image can be captured in FIG. 2B in response to selection of second graphical element 166₂ by the user. In some other implementations, the additional image can be captured automatically.

The request resolution engine 130 utilizes the additional image to determine additional attributes of the object. For example, the request resolution engine 130 can provide the captured additional image to one or more of the image processing engine(s) 142. Based on image processing, one or more of the image processing engine(s) 142 can determine text attributes of "Hypothetical Vineyard", "Merlot", and "2014" (e.g., using OCR), and return such text to the request resolution engine 130. Additionally or alternatively, one or more of the image processing engine(s) 142 can provide a fine-grained classification that particularly identifies the Hypothetical Vineyard's 2014 merlot. As described herein, in some implementations the request resolution engine 130 may, for sensor data (e.g., an image) captured in response to a prompt, only invoke a subset of available image processing engines for determining additional attribute(s) based on such sensor data. For example, the request resolution engine 130 may provide the additional image to only an OCR image processing engine, of engine(s) 142, based on prompt 272A (FIG. 2A) being tailored to result in a subsequent image for which attribute(s) are to be derived utilizing OCR. Also, for example, the request resolution engine 130 may not provide the additional image to a general classification engine, of engine(s) 142, based on the general classification being already resolved. In some of those implementations, this may conserve various computational resources. This may be particularly beneficial when, for example, one or more of the image processing engine(s) 142 are implemented on the client device 106₁.

The request resolution engine 130 can then determine the request is resolvable based on the additional attributes. For example, the request resolution engine 130 can submit, to one of the agents 146, an agent query that is based on the natural language input and the additional attributes. For example, the request resolution engine 130 can submit an agent query of "cost of vineyard A cabernet sauvignon 2012" and/or a structured agent query such as {intent="wine_cost"; brand="vineyard a"; type="merlot"; vintage="2012"}. Additional content can be received from the agent in response to the agent query, and at least some of the additional content provided for presentation to the user. For example, output 272B of FIG. 2B can be presented based on the additional content. The output 272B specifies the price range, and also asks if the user would like to see links where the user can purchase the bottle of wine. If the user responds affirmatively (e.g., further voice input of "yes") to the output 272B, the links for purchase may be displayed via the interface of FIG. 2B and/or separate interface. The price range and the links may both be based on the additional content received in response to the agent query. The output 272B is illustrated in FIG. 2B as audible output (e.g., provided via a speaker of the client device $106_1$). However, in other implementations a graphical output may additionally and/or alternatively be provided.

Figure 3:
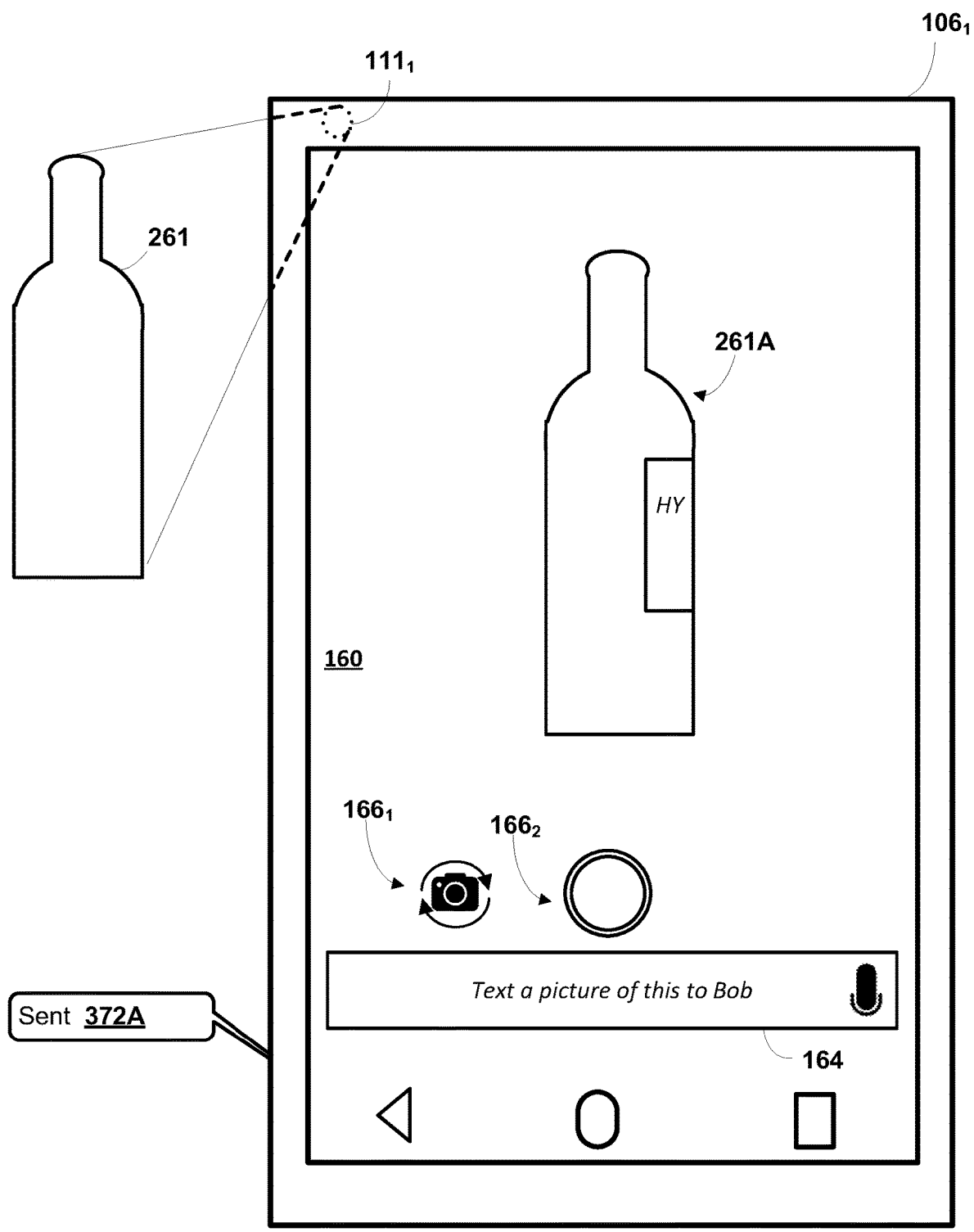

FIG. 3 illustrates another example of how a user (not depicted) may interact with an instance of automated assistant (120 in FIG. 1, not depicted in FIG. 2) operating on, and/or in conjunction with, client device $106_1$ in accordance with implementations described herein. FIG. 3 is similar to FIG. 2A, and like numbering refers to like components. In FIG. 3, the camera $111_1$ has captured a bottle of wine 261 in its field of view and the captured image and the rendition 261A of the bottle of wine 261 are the same as that in FIG. 2A.

However, in FIG. 3 the user has provided natural language input of "Text a picture of this to Bob"—whereas the user instead provided natural language input in FIG. 2A of "How much does this cost".

The request engine 124 of the automated assistant 120 can determine that the natural language input of "text a picture of this to Bob" relates to an object in the environment of the client device $106_1$. In some implementations, the request engine 124 can cause an image of the environment to be captured in response to such a determination (e.g., an image that captures the rendition 261A of FIG. 3). In some other implementations, the user may cause the image to be captured (e.g., through selection of second graphical element $166_2$) and provide the natural language input in conjunction with (e.g., shortly before, during, or shortly after) the capturing of the image.

The request engine 124 provides an indication of the request to the request resolution engine 130. The request resolution engine 130 attempts to resolve the request using the natural language input and the captured image. In the situation of FIG. 3, the request resolution engine 130 determines the request (sending the picture to Bob) can be resolved based on the image itself. As a result, the request resolution engine 130 is able to resolve the request without prompting the user to take additional image(s) (or otherwise provide additional information related to the bottle of wine) and/or without providing the image for processing by the image processing engine(s) 142. For example, the request resolution engine 130 can resolve the request by simply texting the picture to a contact of the user named "Bob". The request resolution engine 130 can optionally provide output 372A of "Sent" to inform the user that the request was resolved.

Accordingly, FIG. 3 provides an example of how a prompt, that is tailored to enable determination of additional object attributes, may optionally be provided only when it is determined a request is not resolvable based on initial sensor data and/or initial user interface input. It is noted that if, in FIG. 3, the user had instead provided natural language input of "text Bob the name of this wine", a prompt would be provided (as the name of the wine would most likely not be resolvable based on an image that conforms to the rendition 261A of FIG. 3).

Accordingly, in these and other manners, whether such a prompt is provided is based on whether the request is resolvable which, in turn, is based on a degree of specificity of the request. For example, "text a picture of this to Bob" does not require any attribute(s) of the object in the image to be known, whereas "text Bob the name of this wine" requires a name of the wine bottle to be known. It is also noted that, in some implementations, the degree of specificity may be based on other factor(s), in addition to, or instead of, natural language input provided with the request. For example, in some implementations no natural language input may be provided in conjunction with a captured image (or other captured sensor data). In those implementations, the degree of specificity may be based on a location of the client device $106_1$, may be based on resolved attribute(s) of the image, and/or based on other factor(s). For example, if a user captures an image of an object at a retail location (e.g., a grocery store), a "cost comparison" or similar request with a high degree of specificity can be inferred. On the other hand, if the user captures an image of the object at a park or other non-retail location, no request can be inferred (e.g., the image can just be stored)—or a request with a lesser (or no) degree of specificity can be inferred.

Figure 4:
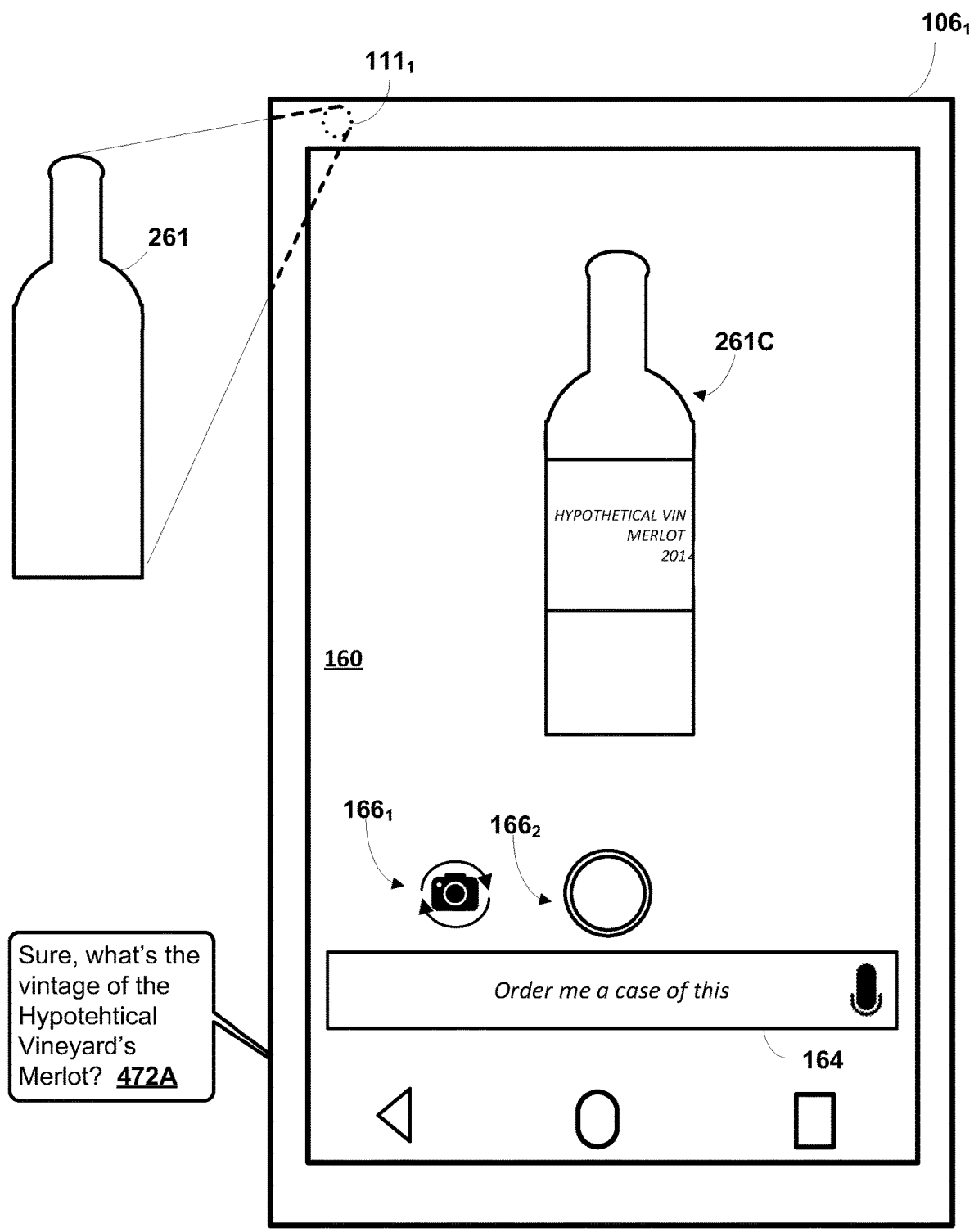

FIG. 4 illustrates another example of how a user (not depicted) may interact with an instance of automated assistant (120 in FIG. 1, not depicted in FIG. 2) operating on, and/or in conjunction with, client device $106_1$ in accordance with implementations described herein. The interface of FIG. 4 is similar to that of FIGS. 2A, 2B, and 3, and like numbering refers to like components. In FIG. 4, the camera $111_1$ has captured the bottle of wine 261 in its field of view. The captured image and the rendition 261C of the bottle of wine 261 is different from the renditions 261A (FIG. 2A, FIG. 3) and 261B (FIG. 2B). The rendition 261C captures most of the label of the bottle of wine 261, but cuts off part of "vineyards" and cuts off the "4" in "2014".

In FIG. 4, the user has provided natural language input of "order me a case of this". The request engine 124 can determine the natural language input is a request related to an object in an environment of the client device $106_1$, and provide an indication of the request to the request resolution engine 130.

The request resolution engine 130 attempts to resolve the request using the natural language input and the captured image. For example, the request resolution engine 130 can provide the captured image to one or more of the image processing engine(s) 142. Based on the image processing, the image processing engine(s) 142 can determine a classification attribute of "wine bottle", a brand attribute of "hypothetical vineyards" (e.g., based on the observable "hypothetical" and the observable "vin"), and a type attribute of "merlot". However, the request resolution engine 130 can determine that an attribute for a required "vintage" field is not resolvable (e.g., a particular year cannot be resolved with a high enough confidence). As a result of the "vintage" field being unresolvable and being required for an "ordering a case" request, the prompt engine 126 determines and provides a prompt 472A of "Sure, what's the vintage of the Hypothetical Vineyard's Merlot?". The prompt 472A is illustrated in FIG. 4 as an audible prompt, but can be graphical in other implementations. The prompt engine 126 can determine the prompt 472A based on the unresolved field (vintage) and based on the resolved attributes (by including reference to the determined attributes for brand and type).

The prompt 472A solicits the user to provide further natural language input (e.g., voice input) that can be utilized to resolve an attribute for the vintage field. For example, the user may respond to the prompt 472A with voice input of "2014", and "2014" utilized as the attribute for the vintage field. In some implementations, the automated assistant 120 may cause a microphone of the client device $106_1$ to be activated upon providing of the prompt 472A, in anticipation of the further voice input. Alternatively, the prompt 472A could be addressed by inputting a second image (e.g., 261B of FIG. 2B) in which the full date "2014" can be seen.

The request resolution engine 130 can then resolve the request, utilizing the additional attribute of "2014", and the previously determined attributes. For example, the request resolution engine 130 can submit, to one of the agents 146, an agent query that causes a case of "Hypothetical Vineyard's 2014 Merlot" to be ordered. Additional content can optionally be received from the agent in response to the agent query (e.g., a confirmation of the order, a total price, and/or an estimated delivery date), and at least some of the additional content optionally provided for presentation to the user.

Figure 5A:
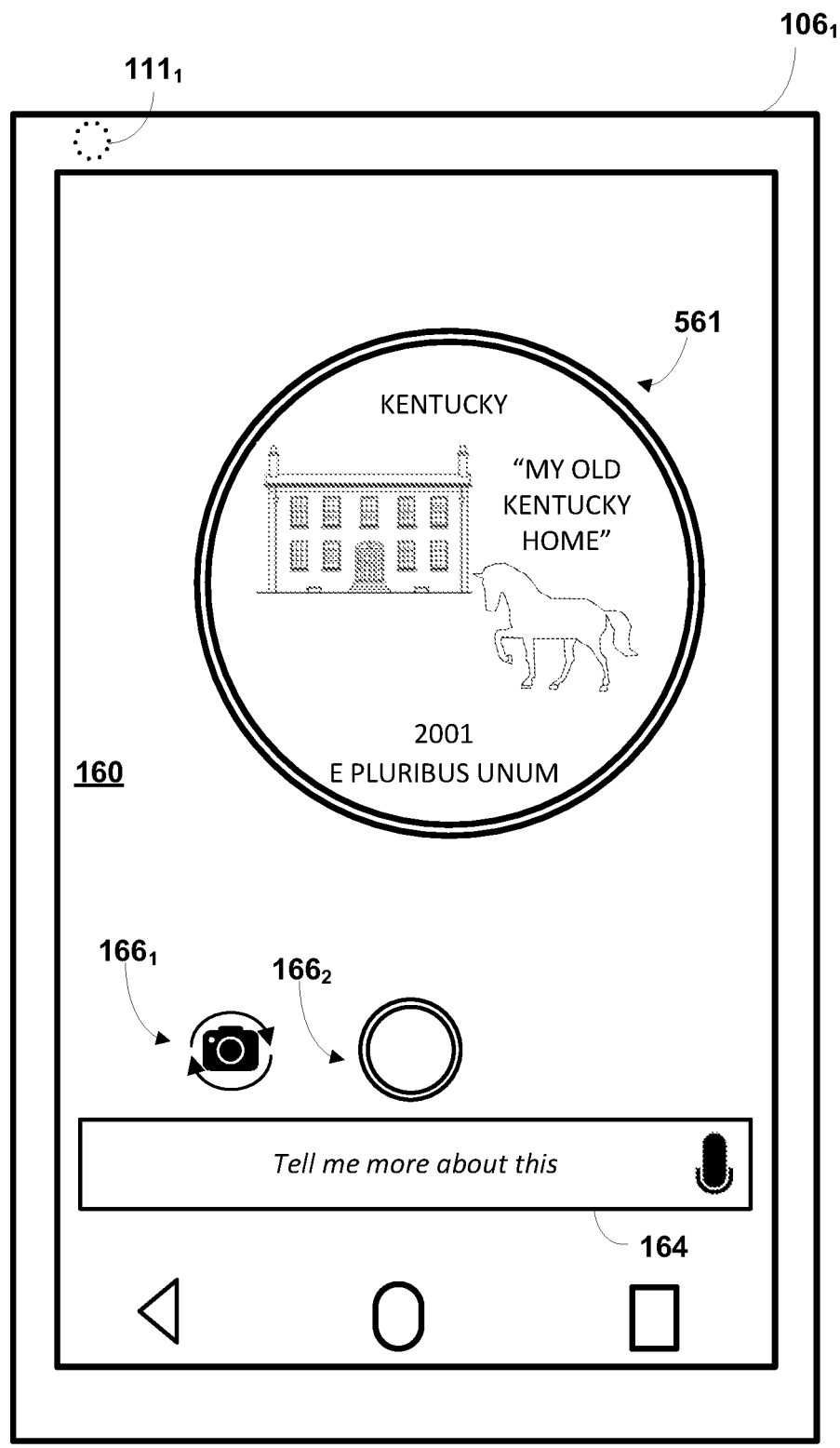
Figure 5B:
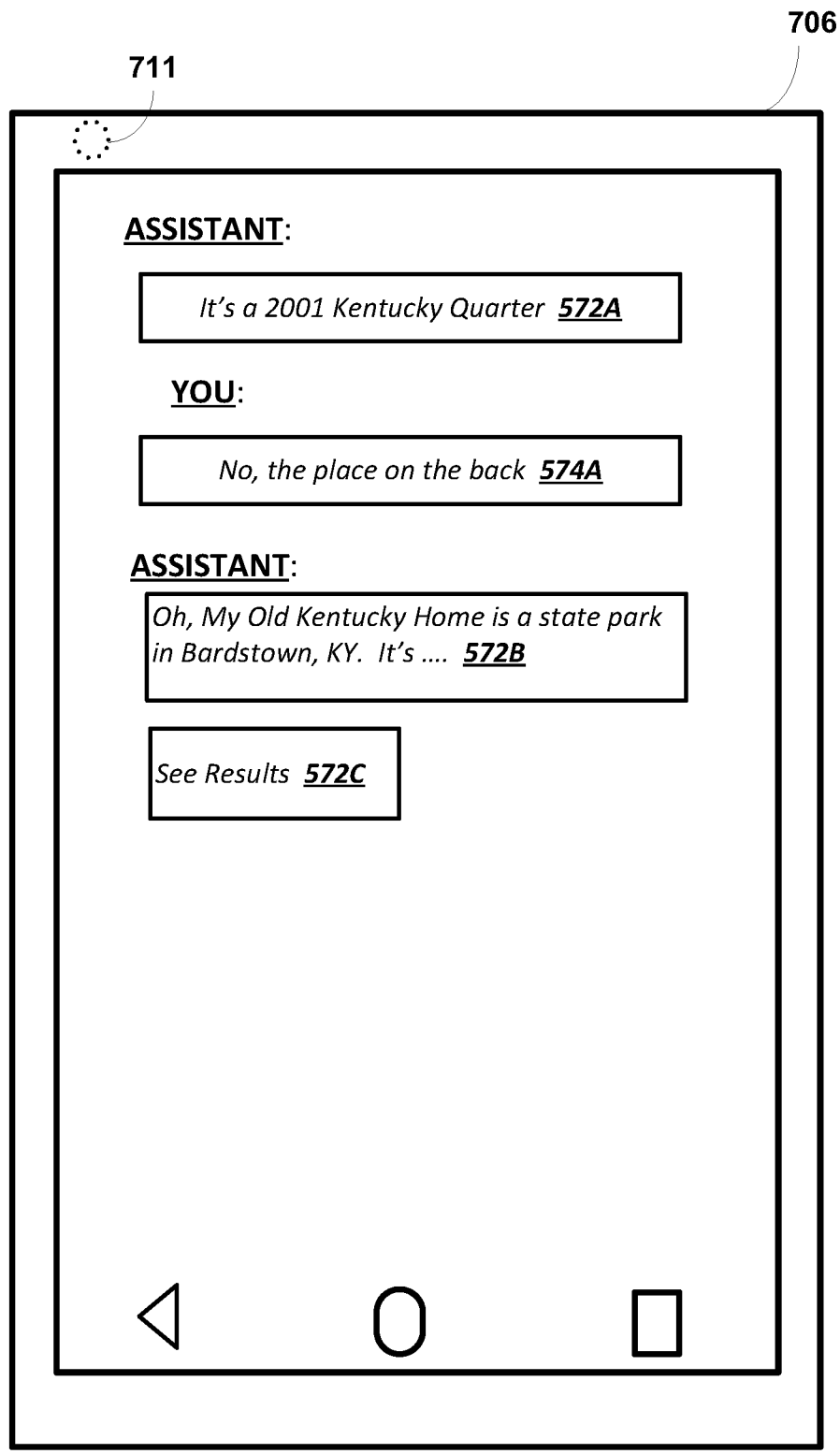

FIGS. 5A and 5B illustrate another example of how a user (not depicted) may interact with an instance of automated assistant (120 in FIG. 1, not depicted in FIG. 2) operating on, and/or in conjunction with, client device $106_1$ in accordance with implementations described herein. The interface of FIG. 5A is similar to that of FIGS. 2A, 2B, 3, and 4, and like numbering refers to like components.

In FIG. 5A, the camera $111_1$ has captured a quarter 561 and, in particular, the "tails" side of a Kentucky state quarter. In FIG. 5A, the user has provided natural language input of "tell me more about this". The request engine 124 can determine the natural language input is a request related to a captured image, and provides an indication of the request to the request resolution engine 130.

The request resolution engine 130 attempts to resolve the request using the natural language input and the captured image. For example, the request resolution engine 130 can provide the captured image to one or more of the image processing engine(s) 132. Based on the image processing, the request resolution engine 130 can determine that it is a "2001 Kentucky Quarter". For example, the request resolution engine 130 can determine that it is a "2001 Kentucky Quarter" based on one of the image processing engine(s) 142 granularly classifying it as a "2001 Kentucky Quarter". Also for example, the request resolution engine 130 can additionally or alternatively determine that it is a "2001 Kentucky Quarter" based on one of the image processing engine(s) 142 classifying it as a "Quarter", and based on an another one of the image processing engine(s) 142 recognizing text of "Kentucky" and "2001" in the image. The request resolution engine 130 can further determine, based on providing the captured image to image processing engine(s) 142, additional text and/or an additional entity present on the quarter. For example, OCR processing by one of the processing engine(s) 142 may also identify the text "my old Kentucky home" and/or image processing may identify the "house" on the quarter as the "My Old Kentucky Home" house.

As shown in FIG. 5B, the automated assistant 120 initially provides output 572A of "It's a 2001 Kentucky Quarter". Such output 572A can be provided initially by the automated assistant 120 based on, for example, determining that the target degree of specificity for a "Quarter" classification is a "year" and "state". In response, to the initial output 572A, the user provides natural language input 574A of "no, the place on the back". Based on the natural language input 574A, the request resolution engine 130 determines an adjusted target degree of specificity of a particular place/location referenced by the quarter. In other words, the request resolution engine 130 adjusts the target degree of specificity based on the feedback provided by the user in the natural language input 574A. In response, the request resolution engine 130 attempts to resolve the request with the adjusted target degree of specificity. For example, the request resolution engine 130 can determine attribute(s) resolved from the image that relate to a "place", such as text and/or an entity that relate to "my old Kentucky home". If no such attribute(s) were resolved based on the captured image, a prompt can be provided to request the user provide user interface input indicating the "place" and/or capture an additional image of the "place".

However, in the example of FIG. 5B, the request resolution engine 130 has resolved an attribute of "my old Kentucky home" based on the previously captured image. Accordingly, in response to the user input 574A, the request resolution engine 130 is able to resolve the request with the adjusted degree of specificity, and generates response 572B based on the "my old Kentucky home" attribute. For example, the request resolution engine 130 can issue a search request of "my old Kentucky home", and receive response 572B, and additional search results, in response to the search request. The request resolution engine 130 can provide the response 572B as output, along with a selectable option 572C that can be selected by the user to cause additional search results to be displayed.

In some implementations, a target degree of specificity for "quarter" classifications may be adapted for the user and/or other user(s) based at least in part on the interaction of FIGS. 5A and 5B. For example, based on such an interaction and/or similar historical interactions, a learned target degree of specificity of "specific place/location on the quarter" can be determined for "quarter" classifications. Accordingly, subsequent requests related to captured image(s) of a quarter can be adapted in view of such determined degree of specificity. In these and other manners, user feedback provided via interactions with the automated assistant 120 can be utilize to learn when a request is resolved and/or to learn an appropriate target degree of specificity for various future requests.

Figure 6:
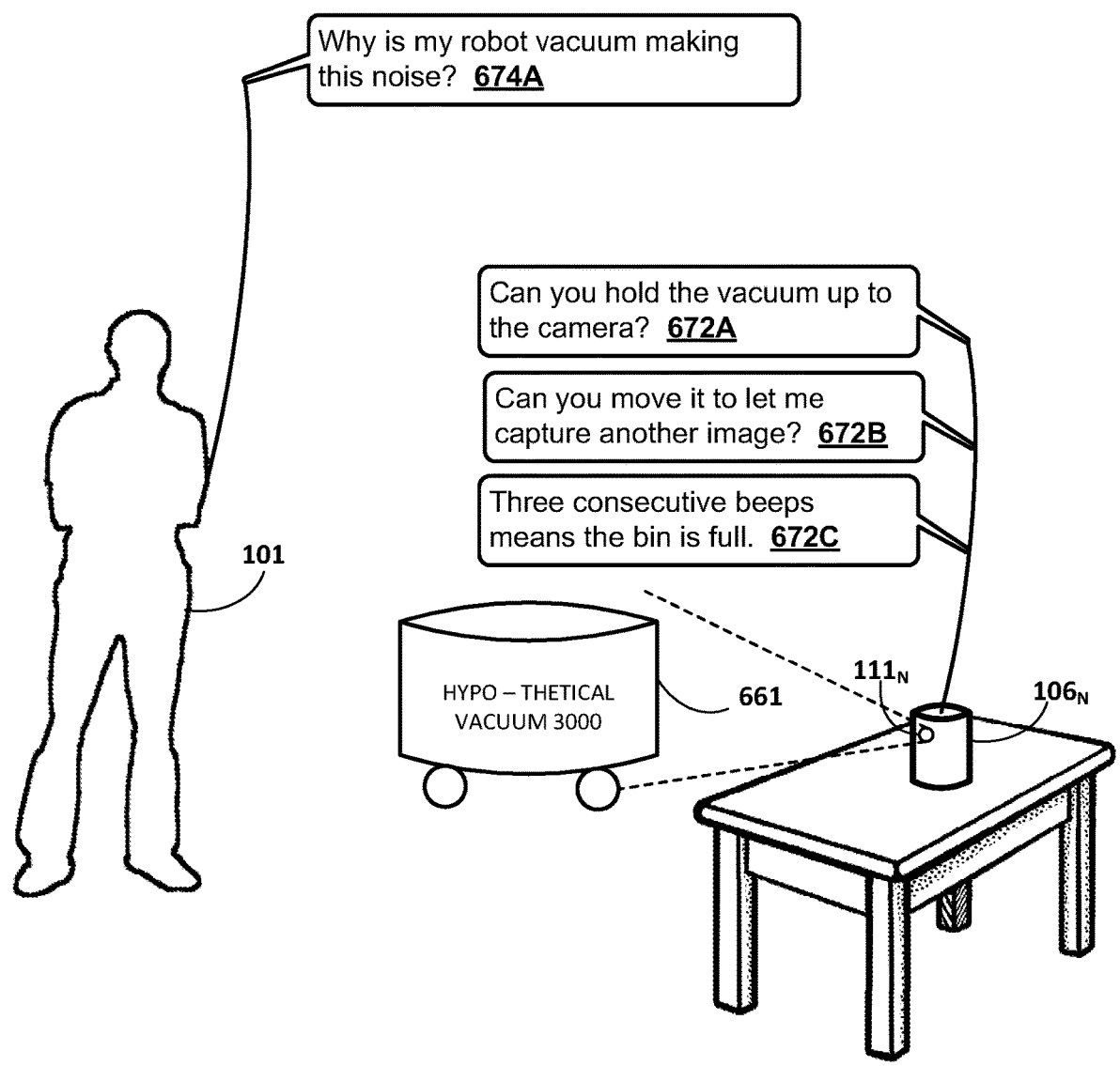

FIG. 6 depicts another example scenario in which disclosed techniques may be employed. In FIG. 6, client device $106_N$ takes the form of a standalone interactive speaker that enables a user 101 to engage in a spoken human-to-computer dialog with automated assistant 120 executing on, and/or in conjunction with, client device $106_N$. To this end, client 106$_N$ may also include one or more microphones (not depicted in FIG. 6) for detecting spoken input from user 101. Client device $106_N$ also includes camera $111_N$ that is configured to capture images. While not depicted in FIG. 6, in some implementations, client device $106_N$ may also include a display device.

In this example, user 101 provides voice input 674A of "why is my robot vacuum making this noise?"

The request engine 124 of the automated assistant 120 can determine that the natural language input of "why is my robot vacuum making this noise?" relates to an object in the environment of the client device $106_N$ and to a noise being made by the object. In some implementations, the request engine 124 can cause audio (e.g., audio that attempts to capture "this noise") and/or an image to be captured in response to such a determination.

The request engine 124 provides an indication of the request to the request resolution engine 130. The request resolution engine 130 attempts to resolve the request using the natural language input and the captured audio and/or captured image. For example, the request resolution engine 130 can provide the captured audio to one or more of the additional processing engine(s) 134. The additional processing engine(s) 134 can analyze the audio and determine an attribute of "three consecutive beeps" from the audio. In other words, the audio captured the robot vacuum making three consecutive beeps.

The request resolution engine 130 can then attempt to resolve the request by submitting an agent query, e.g., to a search system agent, that is based on the input 674A and the resolved audio attribute (e.g., an agent query of "what does three consecutive beeps mean for robot vacuum"). In response to the agent query, the search system may fail to return any answer or may not return an answer with a confidence level that satisfies a threshold. In response, the request resolution engine 130 can determine the request cannot be resolved.

Based on the request being unresolvable, the prompt engine 126 determines and provides a prompt 672A of "Can you hold the vacuum up to the camera?". For example, the prompt 672A is provided for audible rendering via a speaker of the client device $106_N$. The prompt 672A solicits the user to hold the vacuum robot 661 (that is making "this noise") in the field of view of the camera $111_N$ in an attempt to capture an image that can be utilized to resolve additional attribute(s) related to the vacuum robot 661.

Image(s) can be captured after the user initially holds the vacuum up to the camera $111_N$. However, the request resolution engine 130 may determine that no attribute(s) can be resolved from the image(s) and/or that any resolved attributes are still insufficient to resolve the request. In response, another prompt 672B is provided that instructs the user to "move it to let me capture another image".

Additional mage(s) can be captured after the user 101 further moves the vacuum, and the request resolution engine 130 may be able to resolve the request based on attributes resolved from the additional image(s). For example, the additional image(s) may have enabled determination of the "Hypo-thetical Vacuum" brand and/or the "3000" model of the vacuum, enabling an agent query of "what does three consecutive beeps mean for hypo-thetical vacuum 3000" to be formulated by the request resolution engine 130. That agent query can be submitted to a search system agent, and a high confidence answer returned in response. The further output 672C can be based on the high confidence answer. For example, the high confidence answer may conform to the further output 672C of "Three consecutive beeps means the bin is full".

Figure 7:
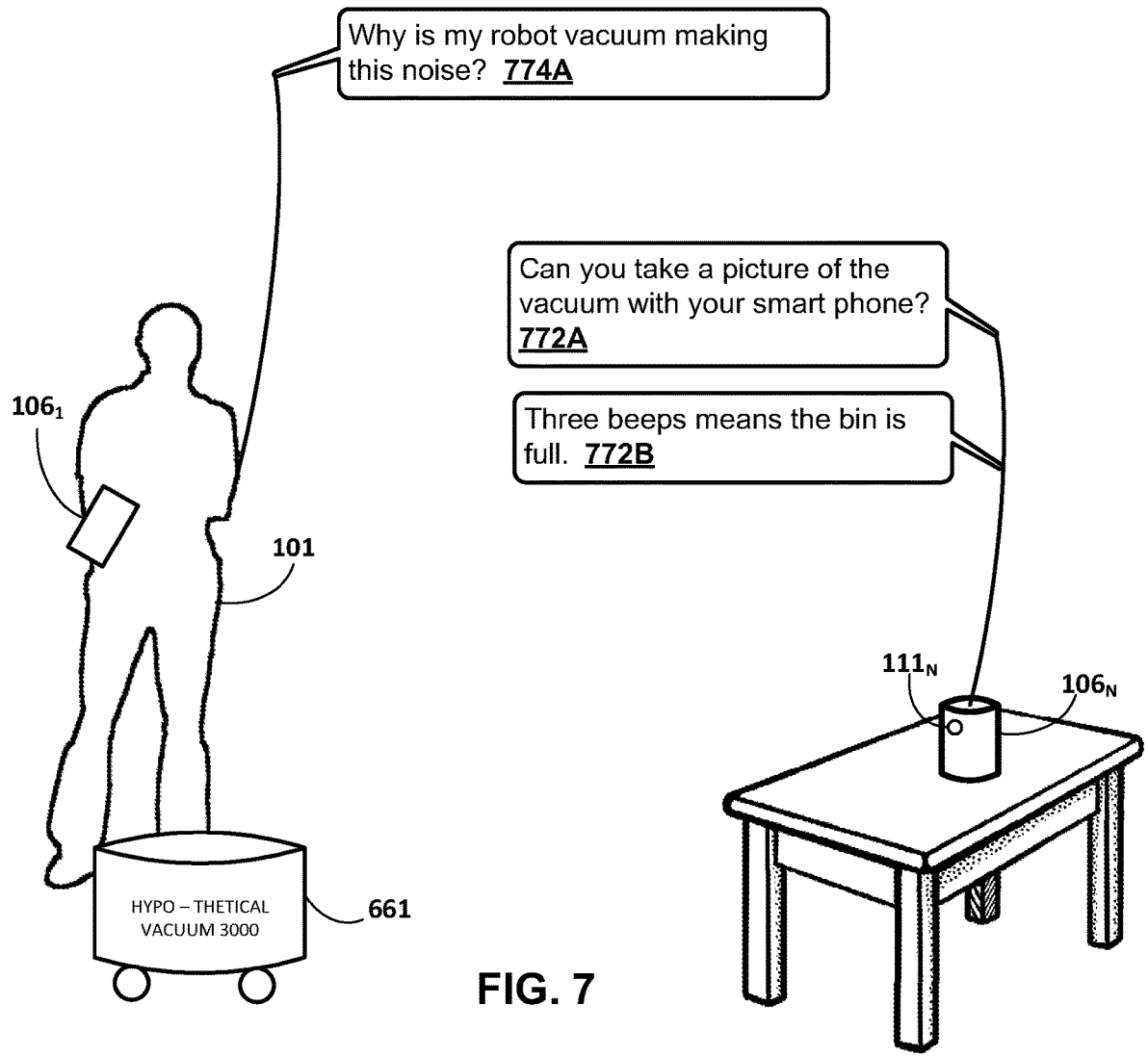

FIG. 7 is similar to FIG. 6. In particular, the natural language input 774A provided by the user 101 in FIG. 7 is the same as the natural language input 674A of FIG. 6. Moreover, the automated assistant 120 may likewise determine it is unable to resolve a request based on the natural language input 774A and based on any initial audio and/or image(s) captured. In FIG. 7, the prompt 772A requests that the user 101 take a picture with his/her separate smartphone instead of requesting the user hold the vacuum 661 up to camera $111_N$. For example, as illustrated in FIG. 7, the user 101 can utilize the client device $106_1$ (which may be a smartphone) to capture an image of the vacuum 661 while the vacuum 661 rests on the ground. The client device $106_1$ and the client device $106_N$ can be linked to the same user via the automated assistant 120 as described herein. The automated assistant 120 can utilize the image captured by the client device $106_1$ (in response to prompt 772A) to resolve the request. Output 772B is the same as output 672C and can be based on attribute(s) derived from the image captured by the client device $106_1$, as well as attributes based on the audio captured via the client device $106_N$. In these and other manners, the automated assistant 120 is able to utilize natural language input and/or sensor data from multiple devices of a user in resolving a request.

Figure 8:
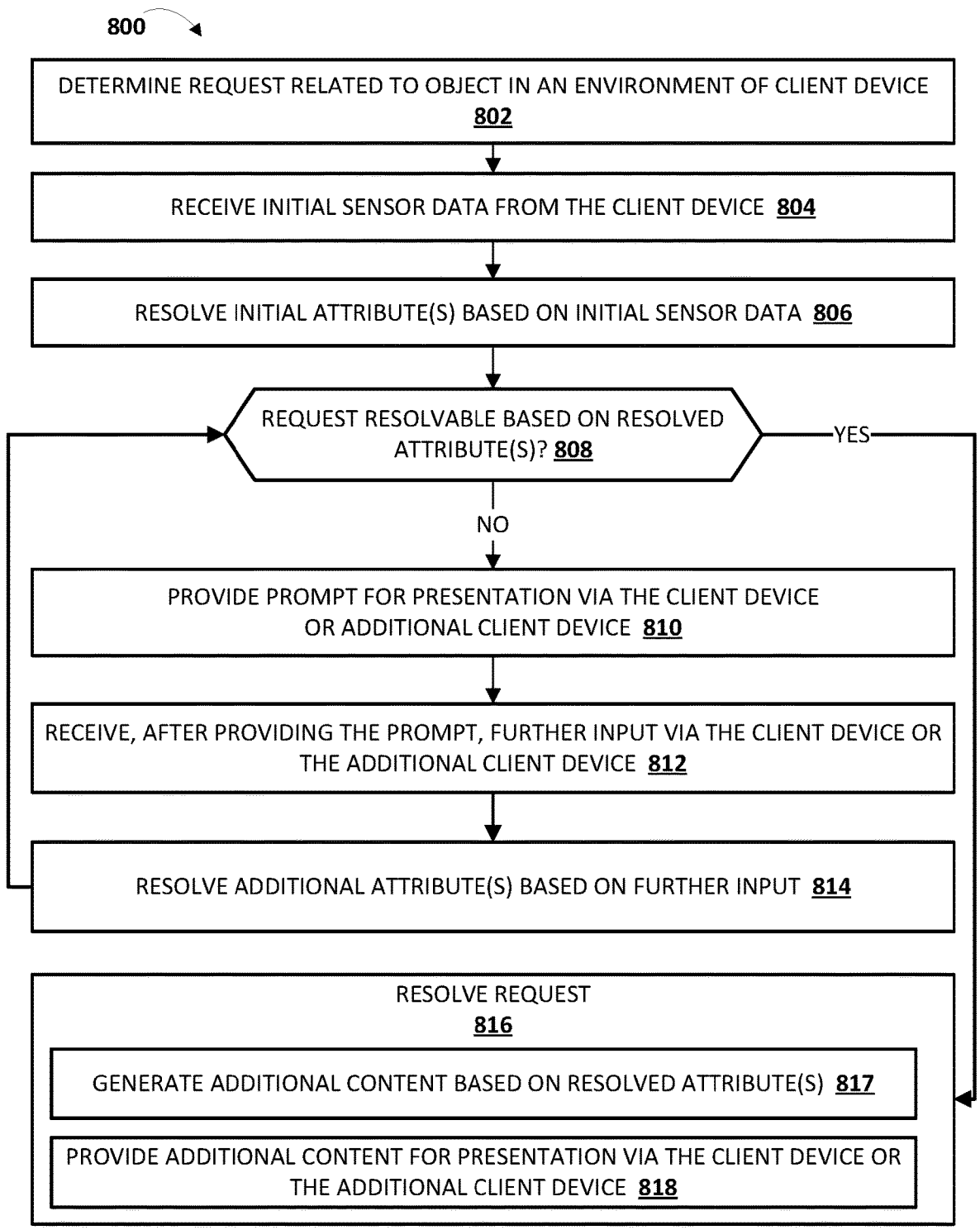
FIG. 8 depicts a flowchart illustrating an example method according to implementations disclosed herein.

FIG. 8 is a flowchart illustrating an example method 800 according to implementations disclosed herein. For convenience, the operations of the flow chart are described with reference to a system that performs the operations. This system may include various components of various computer systems, such as one or more components of automated assistant 120. Moreover, while operations of method 800 are shown in a particular order, this is not meant to be limiting. One or more operations may be reordered, omitted or added.

At block 802, the system determines a request related to an object in an environment of a client device. In some implementations, the system can determine the request based on natural language input provided via an automated assistant interface of the client device. The natural language input can include voice input and/or typed input. In some implementations, the system can additionally or alternatively determine the request based on an image, a sound recording, and/or other sensor data being captured via the client device. In some implementations, the system can additionally or alternatively determine the request based on an interface element selected by the user and/or based on an image and/or other sensor data being captured via a particular interface.

At block 804, the system receives initial sensor data from the client device. For example, the system can receive initial image(s) captured by a camera of the client device. In some additional or alternative implementations, the system additionally or alternatively receives initial sensor data from an additional client device, such as an additional client device having an association to a user that is also associated with the client device.

At block 806, the system resolves initial attribute(s) of the object based on the initial sensor data received at block 804. For example, where the initial sensor data includes initial image(s), the system can resolve the initial attribute(s) based on providing the initial image(s) to one or more image processing engines, and receiving the initial attribute(s) from the engine(s) in response.

At block 808, the system determines whether the request of block 802 is resolvable based on the so-far resolved attribute(s) of the object. In some implementations, the system determines whether the request is resolvable based on whether the so-far resolved attribute(s) define the object with a target degree of specificity. In some of those implementations, the target degree of specificity is a target degree of classification of the object in a classification taxonomy and/or is defined with reference to one or more fields to be defined, where the fields for the object can be dependent on a classification (general or specific) of the object. In some of those implementations, the target degree of specificity can additionally or alternatively be determined based on initial natural language input provided by the user, feedback provided by the user, historical interactions of the user and/or other users, and/or location and/or other contextual signals.

If, at block 808, the system determines the request is resolvable, the system proceeds to block 816 and resolves the request. In some implementations blocks 808 and 816 may occur in tandem (e.g., the system may determine the request is resolvable, or not, based on attempting to resolve the request at block 816).

If, at block 808, the system determines the request is not resolvable, the system proceeds to block 810 and provides a prompt for presentation via the client device, or an additional client device. The prompt can, for example, prompt a user to capture additional sensor data (e.g., take an additional image), move object(s), and/or provide user interface input (e.g., natural language input). In some implementations, the system determines the prompt based on one or more attribute(s) for the object that have been resolved (e.g., a classification attribute) and/or based on field(s) that are not defined by the already resolved attribute(s).

At block 812, the system receives, after providing the prompt, further input. The system receives the further input via the client device or the additional client device. The further input can include additional sensor data (e.g., additional image(s)) and/or user interface input (e.g., natural language input).

At block 814, the system resolves additional attribute(s) based on the further input. The system then proceeds back to block 808. For example, where the additional sensor data includes additional image(s), the system can resolve the additional attribute(s) based on providing the additional image(s) to one or more image processing engines, and receiving the additional attribute(s) from the engine(s) in response.

In some implementations, block 816 includes sub-blocks 817 and 818. At sub-block 817, the system generates additional content based on one or more of the resolved attributes. In some implementations the systems generates the additional content based on formulating a request based on one or more of the resolved attributes, submitting the request to an agent, and receiving the additional content from the agent in response to the request. In some of those implementations, the system can select the agent may based on the resolved attributes (e.g., attributes resolved from sensor data and/or natural language input). At block 818, the system provides the additional content for presentation via the client device or the additional client device. For example, the system can provide the additional content for audible and/or graphical presentation. For instance, the system can provide the additional content for audible presentation by providing streaming audio, that includes the additional content, to the client device or the additional client device.

FIG. 9 is a block diagram of an example computing device 910 that may optionally be utilized to perform one or more aspects of techniques described herein. In some implementations, one or more of a client device, automated assistant 120, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image (e.g., augmented reality displays associated with "smart" glasses). The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method of FIG. 8, as well as to implement various components depicted in FIG. 1.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined. Furthermore, certain processing according to the present disclosure may take place exclusively on the user's device such that data and related processing are not shared to a network or other third party device or service, and may be encrypted and/or password protected for additional privacy and security.

What is claimed is:

1. A method implemented by one or more processors, comprising:
   receiving at least one image captured by a camera of a client device;
   determining that the at least one image relates to a request related to an object captured by the at least one image;
   in response to determining that the at least one image relates to the request related to the object:
      causing image processing to be performed on the at least one image;
      determining, based on the image processing of the at least one image, that at least one parameter, of the object, necessary for resolving the request is not resolvable based on the image processing of the at least one image, wherein the at least one parameter is dependent on a classification of the object;
   determining, based on at least one of the request and the image processing of the at least one image, an additional attribute for an additional parameter that is necessary for resolving the request;
   in response to determining that the at least one parameter necessary for resolving the request is not resolvable:
      providing, for presentation via the client device or an additional client device, a prompt that is tailored to the at least one parameter;
      receiving, in response to the prompt, at least one of:
         an additional image captured by the camera, and
         spoken voice input;
      resolving a given attribute for the at least one parameter based on at least one of:
         the additional image received in response to the prompt, and
         the spoken voice input received in response to the prompt; and
      resolving the request based on the given attribute and the additional attribute, wherein resolving the request based on the given attribute and the additional attribute comprises:
         issuing a query based on the additional attribute and based on the resolved given attribute for the at least one parameter;
         receiving one or more results that are responsive to the issued query; and
         causing at least one result, of the received one or more results, to be presented, via a user interface of the client device, as a response to the request.

2. The method of claim 1, wherein determining that the at least one image relates to a request related to an object captured by the at least one image is based on a user context determined based on one or more signals from the client device or the additional client device.

3. The method of claim 2, wherein the one or more signals include at least one location signal.

4. The method of claim 1, wherein determining that the at least one image relates to a request related to an object captured by the at least one image is based on natural language input received via a user interface input device of the client device or the additional client device.

5. The method of claim 1, further comprising:
   determining a classification attribute of the object;
   determining a plurality of parameters necessary for resolving the request based on the classification attribute of the object, the at least one parameter being one of the plurality of parameters; and
   wherein determining that the at least one parameter is not resolved comprises:
      determining that the image processing of the at least one image fails to define the given attribute for the at least one parameter.

6. The method of claim 5, wherein issuing the query based on the object and based on the resolved given attribute for the at least one parameter comprises:
   transmitting, to an agent over one or more networks, the issued query based on the object and based on the given attribute for the at least one parameter; and
   receiving the one or more results that are responsive to the query from the agent in response to transmitting the agent request.

7. The method of claim 6, further comprising:
   selecting the agent from a plurality of available agents based on natural language input provided by the user via the client device or the additional client device, the natural language input being spoken or typed user interface input;
   wherein transmitting the request to the agent is based on selecting the agent from the plurality of available agents.

8. The method of claim 1, wherein the additional image is received in response to the prompt, and wherein resolving the given attribute is based on the additional image.

9. The method of claim 1, wherein the spoken voice input is received in response to the prompt, and wherein resolving the given attributed in based on the spoken voice input.

10. A method implemented by one or more processors, comprising:
    processing at least one image captured by a camera of an electronic device to resolve one or more attributes for an object captured in the at least one image;
    selecting one or more fields, for the object and dependent on a classification of the object, that are undefined by the attributes resolved by the processing of the at least one image;
    determining whether the selected one or more fields are necessary for resolving a request related to the object captured by the at least one image;
    in response to determining that the selected one or more fields are necessary for resolving the request, providing, via the electronic device or an additional electronic device, a prompt that is tailored to at least one of the selected one or more fields;

receiving, in response to the prompt, at least one of:
an additional image captured by the camera, and
user interface input;
resolving a given attribute for the selected one or more fields based on the at least one of the additional image and the user interface input;
determining additional content based on the resolved given attribute and based on at least one of the attributes resolved by the processing of the at least one image, wherein determining the additional content comprises:
issuing a query based on the at least one of the attributes resolved by the processing of the at least one image and based on the resolved given attribute for the selected one or more fields;
receiving one or more results that are responsive to the issued query; and
providing, via the electronic device, the additional content for presentation to the user, wherein providing the additional content for presentation to the user comprises:
causing at least one result, of the received one or more results, to be presented, via a user interface of the client device, as a response to the request.

11. The method of claim 10, wherein the one or more attributes resolved by the processing include a classification for the object, and further comprising:
determining the fields based on the fields being defined for the classification.

12. The method of claim 10, wherein the additional image is received in response to the prompt, and further comprising:
selecting a subset of available image processing engines for processing the at least one additional image, wherein the available image processing engines of the subset are selected based on being associated with resolution of the one or more fields;
wherein resolving the given attribute for the selected one or more fields is based on application of the at least one additional image to the selected subset of the available image processing engines, wherein resolving the given attribute occurs without any application of the at least one additional image to other of the available image processing engines not included in the selected subset.

13. A system, comprising:
memory storing instructions;
one or more processors executing the instructions stored in the memory, wherein in executing the instructions the one or more processors are to:
receive at least one image captured by a camera of a client device;
determine that the at least one image relates to a request related to an object captured by the at least one image;
in response to determining that the at least one image relates to the request related to the object:
cause image processing to be performed on the at least one image;
determine, based on the image processing of the at least one image, that at least one parameter, of the object, necessary for resolving the request is not resolvable based on the image processing of the at least one image, wherein the at least one parameter is dependent on a classification of the object;
determine, based on at least one of the request and the image processing of the at least one image, an additional attribute for an additional parameter that is necessary for resolving the request;
in response to determining that the at least one parameter necessary for resolving the request is not resolvable:
provide, for presentation via the client device or an additional client device, a prompt that is tailored to the at least one parameter;
receive, in response to the prompt, a spoken voice input;
resolve a given attribute for the at least one parameter based on the spoken voice input received in response to the prompt; and
resolve the request based on the given attribute and the additional attribute, wherein in resolving the request based on the given attribute and the additional attribute one or more of the processors are to:
issue a query based on the additional attribute and based on the resolved given attribute for the at least one parameter;
receive one or more results that are responsive to the issued query; and
cause at least one result, of the received one or more results, to be presented, via a user interface of the client device, as a response to the request.

14. The system of claim 13, wherein in determining that the at least one image relates to a request related to an object captured by the at least one image, one or more of the processors are to determine that the at least one image relates to a request related to an object captured by the at least one image based on a user context determined based on one or more signals from the client device or the additional client device.

15. The system of claim 14, wherein the one or more signals include at least one location signal.

16. The system of claim 13, wherein in determining that the at least one image relates to a request related to an object captured by the at least one image, one or more of the processors are to determine that the at least one image relates to a request related to an object captured by the at least one image based on natural language input received via a user interface input device of the client device or the additional client device.

17. The system of claim 13, wherein in executing the instructions one or more of the processors are to:
determine a classification attribute of the object;
determine a plurality of parameters necessary for resolving the request based on the classification attribute of the object, the at least one parameter being one of the plurality of parameters; and
wherein in determining that the at least one parameter is not resolved one or more of the processors are to:
determine that the image processing of the at least one image fails to define the given attribute for the at least one parameter.

* * * * *